(12) United States Patent
Murasaki

(10) Patent No.: US 6,706,229 B2
(45) Date of Patent: Mar. 16, 2004

(54) MOLDING METHOD OF MOLDED SURFACE FASTENER, MOLDED SURFACE FASTENER MANUFACTURED BY THE METHOD, AND MOLDING APPARATUS THEREOF

(75) Inventor: Ryuichi Murasaki, Toyama-ken (JP)

(73) Assignee: YKK Corporation, Tokyo (JP)

( * ) Notice: Subject to any disclaimer, the term of this patent is extended or adjusted under 35 U.S.C. 154(b) by 299 days.

(21) Appl. No.: 09/825,982

(22) Filed: Apr. 5, 2001

(65) Prior Publication Data

US 2001/0055661 A1 Dec. 27, 2001

Related U.S. Application Data

(62) Division of application No. 09/290,728, filed on Apr. 12, 1999.

(51) Int. Cl.⁷ .............................................. B29C 47/18
(52) U.S. Cl. ............. 264/167; 264/173.17; 264/177.16; 425/381; 425/465; 425/166
(58) Field of Search ........................... 264/167, 173.17, 264/177.16; 425/380, 381, 465, 466; 24/452, 442, 446, 448; 428/100

(56) References Cited

U.S. PATENT DOCUMENTS

| 3,147,528 A |   | 9/1964 | Erb |   |
|---|---|---|---|---|
| 3,252,181 A | * | 5/1966 | Hureau | 425/224 |
| 3,266,113 A | * | 8/1966 | Flanagan, Jr. | 24/452 |
| 3,422,648 A | * | 1/1969 | Lemelson | 72/17.2 |
| 3,594,865 A |   | 7/1971 | Erb |   |
| 3,932,090 A | * | 1/1976 | Brumlik | 425/381 |
| 4,001,366 A | * | 1/1977 | Brumlik | 264/147 |
| 4,344,654 A |   | 8/1982 | Apezynski |   |
| 4,725,221 A |   | 2/1988 | Blanz |   |
| 4,920,617 A |   | 5/1990 | Higashinaka |   |
| 5,011,642 A | * | 4/1991 | Welygan et al. | 264/167 |
| 6,066,281 A | * | 5/2000 | Provost | 264/167 |

FOREIGN PATENT DOCUMENTS

FR      2 082 591      12/1971

* cited by examiner

*Primary Examiner*—Mark Eashoo
(74) *Attorney, Agent, or Firm*—Finnegan, Henderson, Farabow, Garrett and Dunner, L.L.P.

(57) ABSTRACT

Molten resin material is continuously extruded from a first extruding hole extending in a width direction of a first extruding nozzle, and is passed through a second extruding nozzle which is arranged a front surface of the first extruding nozzle and has a second extruding hole at a position corresponding to the first extruding hole. The second extruding hole is a single extruding hole having a plurality of longitudinal rectangular openings arranged at the same pitch in the width direction, and a communicating section with which one end of the respective rectangular openings communicate, and the first extruding hole is a single extruding hole having coupling-element-molding openings arranged corresponding to the rectangular openings and a base-member-molding opening corresponding to the communicating section. Then, by relatively vibrating the first extruding nozzle and second extruding nozzle in the width direction so that the confronting extruding holes may mutually cross, a surface fastener is continuously molded, while individually molding the coupling element having a coupling head portion projecting forward and backward in a molding direction from one end of a stem portion standing on a surface of a sheet-like base member. At this time, each coupling element is approximately shaped like a parallelogram in its plan view.

13 Claims, 37 Drawing Sheets

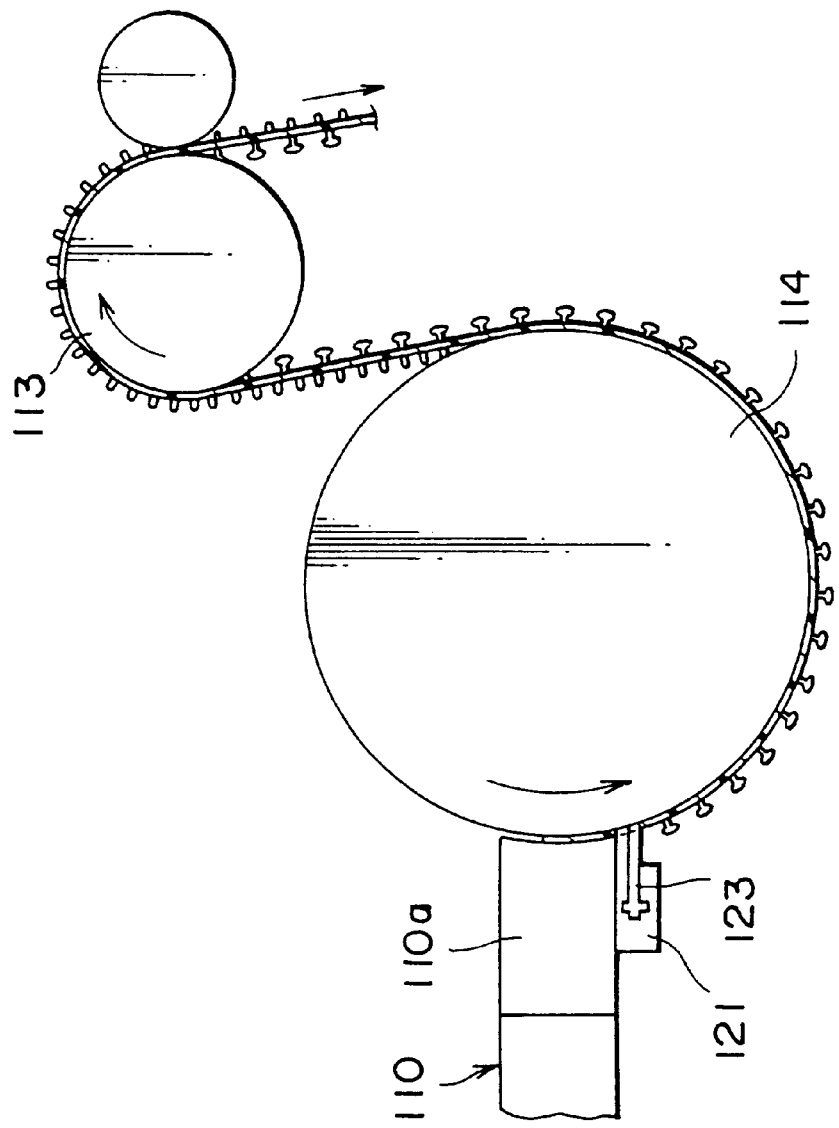

MOLDING METHOD OF MOLDED SURFACE FASTENER, MOLDED SURFACE FASTENER MANUFACTURED BY THE METHOD, AND MOLDING APPARATUS THEREOF

This is a division of pending application Ser. No. 09/290,728, filed Apr. 12, 1999 which is incorporated herein by reference.

BACKGROUND OF THE INVENTION

1. Field of the Invention

The present invention relates to a molding method of a molded surface fastener which is made from thermoplastic synthetic resin material and has coupling elements independently and continuously molded integrally on the surface of a sheet-like base member, the Surface fastener, and a molding apparatus thereof. More specifically, it relates to a molding method of a molded surface fastener which can be molded to have various sizes from a fine size to a normal size, and is suitable for various uses in many fields, and which can be molded continuously and efficiently in a single step with a simplified apparatus, a molded surface fastener obtained by the method, and a molding apparatus thereof.

2. Description of the Related Art

Conventional molded surface fasteners are manufactured by various systems. A typical example thereof is a system of manufacturing fasteners by a complete batch system with the injection molding. Another typical system is a system where a die wheel having a lot of molding cavities for coupling elements on the peripheral surface thereof, is rotated in one direction, and in the meantime, molten resin material is continuously introduced to the peripheral surface of the die wheel, so that a sheet-like base member and coupling elements are continuously and integrally molded. According to these systems, it is possible to mold coupling elements having conventionally well known various shapes such as a palm shape or a hook shape.

Furthermore, there is another system, in which a lot of approximately T-shaped extruding holes are provided in an extruding die side by side, while an extruding hole is formed for a base member and communicates with the lower end of each T-shaped extruding hole. According to this system, by simultaneously extruding molten resin from both of the extruding holes, a plurality of pieces of ribs each having an approximately T-shaped cross section are continuously molded on a surface of the sheet-like base member, and then the molten resin molding material is cooled and solidified. Next, the ribs are cut with a predetermined thickness in a direction perpendicular to a drawing direction of the ribs or at a proper angle, while the sheet-like base member is left uncut. After this cutting, the sheet-like base member is drawn in the molding direction, so that the cut coupling elements are individually separated by a desired pitch. Thus, the molded surface fastener is manufactured.

In these molding methods, for example, in the technique of continuously molding surface fasteners on the die wheel, it is difficult to mold a coupling element with a complex form because of the limitation of its shape or size, if improvement of productivity is attempted. On the other hand, if a certain option to the shape or size of the coupling element is attempted to be given, the continuous molding is difficult to achieve, or the number of steps is increased so that the productivity may be lowered. In any case, the difference between advantage and disadvantage would be remarkably large.

On the other hand, in the case of adopting a system in which the drawing processing is applied after cutting the ribs of the molten resin molding material on the surface of the sheet-like base member from the extruding die in order to give a certain option to the sectional shape of a coupling head portion, three steps of extrusion molding, rib cutting, and drawing are required. Especially, a high processing accuracy is required for the step of rib cutting, so that the considerable labor and time are also needed for the maintenance and management thereof.

The present invention is made to solve such conventional problems. Specifically, it has an object to provide a molding method of a molded surface fastener, which can continuously perform the molding with a completely new molding mechanism, and whose maintenance and management are easy, and whose productivity is high, and which has coupling elements each capable of being molded with new shapes until now and by various sizes, and a molded surface fastener obtained by the method, and a manufacturing apparatus thereof.

SUMMARY OF THE INVENTION

Such an object can be achieved by first through the third aspects of the present invention.

According to the first aspect of the present invention, there is provided a molding method of a molded surface fastener for continuously and integrally molding a sheet-like base member and a multiplicity of coupling elements, comprising the steps of: continuously extruding molten resin material from a first extruding hole extending in a width direction of a first extruding nozzle arranged on the downstream side in an extruding direction of the molten resin material via an extruding die of an extruding machine; passing the molten resin material extruded from the first extruding nozzle through a second extruding nozzle which is arranged at a front surface of the first extruding nozzle and has a second extruding hole corresponding to the first extruding hole; and relatively vibrating the first extruding nozzle and the second extruding nozzle in the width direction in such a way that the respective extruding holes facing each other mutually cross, wherein one of the first extruding hole and the second extruding hole includes a plurality of longitudinal rectangular openings arranged in the width direction, and the other extruding hole has coupling-element-molding openings arranged so as to correspond to the rectangular openings.

The most distinguishing feature of this invention is to relatively vibrating the first extruding nozzle which is arranged on the downstream side of the molten resin extruded from the extruding die of the extruding machine and has a multiplicity of openings, and the second extruding nozzle which is arranged in a freely slidable way at the front surface of the first extruding nozzle at the downstream side thereof and has a multiplicity of openings of which number corresponds to that of the openings of the first extruding hole so that the respective corresponding extruding holes may cross each other.

When the molten resin extruded from the extruding die in a sheet-like form passes through the first extruding nozzle and the second extruding nozzle which are relatively vibrating in the width direction, the molten resin is extruded through a communicating space of the first and second extruding holes by the relative vibration of the first extruding hole and the second extruding hole while sequentially moving from a tip of a coupling head portion to a stem portion of each coupling element. While the coupling elements are molded in the extruding direction, the sheet-like base member is continuously molded by the base-member-molding openings of the first extruding nozzle and the second extruding nozzle. At this time, a rising base end of the stem portion is molded integrally on the sheet-like base member.

Preferably, the first extruding hole may have the coupling-element-molding openings, and the second extruding hole may have the longitudinal rectangular openings, and a periphery of each of the longitudinal rectangular openings is formed to have a tapered surface gradually enlarged toward the downstream side in the extruding direction, and that the second extruding nozzle is vibrated on the front surface of the first extruding nozzle. Or alternatively, the first extruding hole may have the longitudinal rectangular openings, and the second extruding hole may have the coupling-element-molding openings, and a periphery of the coupling-element-molding opening is formed to have a tapered surface gradually enlarged toward the downstream side in the extruding direction, and the second extruding nozzle is vibrated at the front surface of the first extruding nozzle.

Since the periphery of the longitudinal rectangular opening of the second extruding nozzle is made to be a tapered surface gradually enlarged toward the extruding direction, or since the periphery of the coupling-element-molding opening of the second extruding nozzle is made to be a tapered surface gradually enlarged toward the extruding side, when the molten resin, which is continuously extruded from the first extruding hole of the first extruding nozzle and has a predetermined form, is sequentially blocked and released repeatedly by the second extruding hole of the vibrating second extruding nozzle, a part of a side of each coupling element already extruded by the second extruding hole of the second extruding nozzle is prevented from being crushed at the front surface thereof by the movement of the second extruding hole, so that a desired form of the coupling element can be obtained.

Further preferably, the first extruding nozzle may be in close contact with the extruding die and then the second extruding nozzle to the first extruding nozzle, so that the molten resin material can be directly extruded from the extruding machine. Further, it is preferable that the molding method further includes a step of cooling the molten resin molding material which has passed through the second extruding nozzle. Therefore, the molten resin extruded from the extruding die is extruded to the first extruding nozzle and the second extruding nozzle which are relatively vibrating in the width direction as it is, and the molten resin is extruded from the portions where the extruding holes of the two nozzles communicate, and the coupling elements are sequentially molded on the sheet-like base member as mentioned above, and thereafter, they are cooled and solidified.

Further, it is preferable that the molding method further includes steps of: extruding the molten resin material from the extruding machine on a peripheral surface of a cooling cylinder rotating in one direction so as to mold a sheet-like molten resin layer on the peripheral surface; and introducing the sheet-like molten resin layer into the first and second extruding nozzles arranged facing the cooling cylinder on a downstream side of the molten resin layer. In this case, the molten resin extruded from the extruding die in a sheet-like form is supplied to the peripheral surface of the cooling cylinder with a cooling means therein, and on the peripheral surface thereof, a sheet-like molten resin layer with a certain thickness is molded. This molten resin layer rotates along with the rotation of the cooling cylinder on the peripheral surface thereof. On the way of that rotation, the molten resin layer is supplied to the first and second extruding nozzles which are relatively vibrating in the width direction, and while being cooled, the coupling elements having a desired form are sequentially molded on the base member as mentioned above.

As mentioned above, in a case where the molten resin material from the extruding machine is extruded onto the peripheral surface of the cooling cylinder rotating in one direction so as to mold a sheet-like molten resin layer on the peripheral surface thereof, and the sheet-like molten resin layer is introduced into the first and second nozzles arranged facing to the peripheral surface of the cooling cylinder on the downstream side of the molten resin layer, the cooling of the molten resin layer is started at the time of being extruded from the extruding machine. Therefore, depending on the materials, the shrinkage may be so considerable that the form may easily be unstable. Thus, it is preferable that the molding method further including a step of molding a plurality of anchor members integrally on opposite edge portions of the sheet-like base member where the coupling elements are not molded, by anchor-member-molding cavities formed on the cooling cylinder at right and left periphery portions in the axial direction thereof. In this case, both the right and left edge portions where the anchor members are molded are cut and eliminated in the later finishing step.

Further preferably, each of the coupling-element-molding openings of one of the extruding holes may be shaped approximately like T or Y, or further a tip of each head-portion-molding openings in the coupling-element-molding openings of one of the extruding holes may be bent toward a base-member-molding opening. Furthermore, a form and size of each coupling element to be molded can be made to be uniform by making the vibration speed constant, or alternatively it is also possible to regularly change the vibration speed, in which case the projecting lengths of the coupling head portions are changed for each specified number of coupling elements arranged in the molding direction.

Alternatively, the vibration speed may be randomly changed. In this case, the projecting lengths of the coupling head portions of the coupling elements arranged in the molding direction are randomly changed. Moreover, it is also possible that at least one of the coupling-element-molding openings among a plurality of coupling-element-molding openings arranged laterally side by side, made to be different from the other coupling-element-molding openings in height. In this case, the heights of a plurality of the coupling elements which are molded and arranged in the width direction of the surface of the base member are made to be different.

According to the above mentioned molding methods of the first aspect of the present invention, the surface fasteners having special forms according to the second aspect of the present invention are continuously molded.

According to the second aspect of the present invention, there is provided a molded surface fastener having a plastic sheet base member and a multiplicity of coupling elements continuously and integrally molded, wherein each of the coupling elements has a stem portion integrally extending upwardly from a surface of the sheet base member and a coupling head portion projecting substantially forward in a molding direction from an end of the stem portion, and each pair of the coupling elements mutually adjacently arranged in the molding direction assumes a mirror symmetrical form, and each pair of the coupling elements mutually adjacently arranged in a direction perpendicular to the molding direction have coupling head portions projecting in parallel to each other.

In a conventional molded surface fastener which is manufactured such that approximately T-shaped ribs are continuously extruded integrally with a sheet-like base member by using a conventional extruding machine, and after cooling the surface fastener, only the ribs are cut by a predetermined pitch in the longitudinal direction thereof, and then, the base member is drawn in the extruding direction, so that a certain gap is made between the coupling elements obtained by cutting, each coupling head portion thereof mainly projects in a direction perpendicular to the molding direction, and furthermore the respective coupling elements adjacent in the molding direction are arranged in parallel with each other. Furthermore, in the molded surface fastener as a product, since the base member is drawn in the molding direction, the thickness of the base member is enlarged at a part of a base end of the stem portion of each coupling element, and the surface of the base member becomes in a state of a little waving in the longitudinal direction.

On the other hand, the projecting direction of the coupling head portion of the coupling element in the molded surface fastener according to the present invention, is mainly the molding direction, and furthermore, the coupling elements arranged adjacent in the molding direction assumes a mirror symmetrical form. Moreover, any particular secondary processing, which was necessary in the conventional molded surface fastener, needs not be applied to the molded surface fastener of the present invention, so that an extremely well-balanced and stable form including the base member can be obtained.

Preferably, in the coupling elements of the molded surface fastener, said certain angle may be 0° in which case, the axes in projecting directions of the coupling head portions arranged in lines in the molding direction are on the same straight line, that is, the projecting directions of the coupling elements are on one straight line. This form of the surface fastener can be made by the molding method in which the first extruding hole has the longitudinal rectangular openings, and the second extruding hole has the coupling-element-molding openings, and a periphery of the coupling-element-molding opening is formed to have a tapered surface gradually enlarged toward the downstream side in the extruding direction, and the second extruding nozzle is vibrated at the front surface of the first extruding nozzle. Alternatively, said certain angle θ may be within a range of 0°<θ≦90°, and an axis in a projecting direction of the coupling head portion extends at said angle with respect to a straight line connecting centers of the respective stem portions, thus the respective head portions adjacently arranged in the molding direction are arranged in a zigzag manner. This form of the surface fastener can be made by the molding method in which the first extruding hole has the coupling-element-molding openings, and the second extruding hole has the longitudinal rectangular openings, and a periphery of each of the longitudinal rectangular openings is formed to have a tapered surface gradually enlarged toward the downstream side in the extruding direction, and that the second extruding nozzle is vibrated on the front surface of the first extruding nozzle.

Then, a form of each coupling element is determined by the shape of the coupling-element-molding opening of the extruding hole. Specifically, a vertical cross section of the coupling element may be approximately shaped like T, in which case an entire shape of each coupling-element-molding opening is also approximately like T. Alternatively, a vertical cross section of the coupling element may be approximately shaped like Y, in which case a shape of the coupling-element-molding opening is approximately like Y.

Furthermore, a tip of each coupling head portion may be bent toward a surface of the base member. In this case, the coupling head portion may project only in one of the molding directions from the stem portion and is bent downward so as to form a so-called hook-shape, or the coupling head portion may project forward and rearward in the molding directions from the stem portion and is bent downward so as to form a palm tree-shape.

Further, it is preferable that thickness of each stem portion in the molding direction thereof and a projecting length of each coupling head portion of the coupling elements, which are mutually adjacently arranged in the molding direction, may be regularly changed in the molding direction. Or alternatively, the thickness of each stem portion in the molding direction thereof and a projecting length of each coupling head portion of the coupling elements, which are mutually adjacently arranged in the molding direction, may be randomly changed in the molding direction. In order to mold coupling elements having these forms, the vibration speed of the first and the second nozzles should be regularly or randomly changed. Furthermore, the heights of the coupling elements from the base member to the top thereof, which are mutually adjacently arranged perpendicularly to the molding direction, can be made to be different. Such a form of the surface fastener can be molded by the molding method in which at least one of the coupling-element-molding openings among a plurality of coupling-element-molding openings arranged laterally side by side, are different from the other coupling-element-molding openings in height.

The molding method and the molded surface fastener can be efficiently achieved by a molding apparatus according to the third aspect of the present invention.

According the third aspect of the present invention, there is provided a molding apparatus of a molded surface fastener for molding a sheet-like base member and a multiplicity of coupling elements integrally by continuous molding, characterized by comprising: a first extruding nozzle having a first extruding hole extending in a width direction thereof; a second extruding nozzle arranged at the front surface of the first extruding nozzle and having a second extruding hole corresponding to the first extruding hole, wherein one of the first extruding hole and second extruding hole is an extruding hole including a plurality of longitudinal rectangular openings arranged in the width direction, the other extruding hole has a plurality of coupling-element-molding openings arranged corresponding to the rectangular openings; and a vibrating means for relatively vibrating the first extruding nozzle and the second extruding nozzle in the width direction so that the corresponding extruding holes may mutually cross.

Preferably, the vibrating means may have a crank mechanism connected to the first extruding nozzle and/or the second extruding nozzle through a link. Or alternatively, the vibrating means may have a-cam contact fixed to the first extruding nozzle and/or the second extruding nozzle, and a cam with which the cam contact are in contact. Since these vibrating means are mechanical, the relative vibrating action of the first and second extruding nozzles can surely and accurately be achieved. Furthermore, each of the vibrating means may comprise a control means for changing the vibration speed, so that the vibrating action can regularly or randomly be controlled, at will.

Further, it is preferable that the first extruding hole may have the coupling-element-molding openings, and the second extruding hole may have the longitudinal rectangular openings, and the periphery of the longitudinal rectangular opening is formed to have a tapered surface gradually enlarged toward a downstream side of an extruding direction thereof, and the second extruding nozzle is connected to the vibrating means. In this case, in the coupling elements extruded from the second extruding nozzle, the axes in the projecting direction of the respective coupling head portions adjacently arranged in the molding direction have a certain angle to the straight line connecting the centers of the respective stem portions.

Alternatively, the first extruding hole may have the longitudinal rectangular openings, and the second extruding hole may have the coupling-element-molding openings, and a periphery of the coupling-element-molding opening is formed to have a tapered surface gradually enlarged toward a downstream side of an extruding direction thereof, and the second extruding nozzle is connected to the vibrating means, In this case, in the coupling elements extruded from the second extruding nozzle, the axes in the projecting direction of the multiplicity of the coupling head portions arranged in lines in the molding direction thereof are on the same straight line.

Further preferably, at least one of a plurality of coupling-element-molding openings arranged side by side laterally may be different from the other coupling-element-molding openings in height. In this case, it is possible to make the heights of some of the coupling elements adjacently arranged perpendicularly to the molding direction, different from the heights of the other coupling elements, so that they can effectively be coupled to the loops having various sizes.

In the molding apparatus for achieving the above-mentioned first molding system, the first extruding nozzle is arranged in series in a die of an extruding machine, and a cooling means for cooling molten resin molding material extruded from the second extruding nozzle, is arranged in front of the second extruding nozzle. In this case, it is efficient to adopt a cooling cylinder as the cooling means, but, of course, it may also be a cooling tank.

In the molding apparatus for achieving the above-mentioned second molding system, a cooling cylinder is in confrontation with a die of an extruding machine, and on a downstream side of a rotational direction of the cooling cylinder, the first extruding nozzle and the second extruding nozzle are arranged facing a peripheral surface of the cooling cylinder with a gap approximately equal to thickness of the base member. In this case, as mentioned above, the molten resin material from the extruding machine is extruded onto the peripheral surface of the cooling cylinder rotating in one direction, and a sheet-like molten resin layer is molded on the peripheral surface. Then, the sheet-like molten resin layer is introduced into the first and second nozzles which are arranged facing to the peripheral surface of the cooling cylinder on the downstream side of the molten resin layer. In this case, since the cooling of the molten resin layer is started at the time of being extruded from the extruding machine. Depending on the materials, the surface fastener may considerably shrinks and may easily be unstable. Therefore, it is preferable that anchor-member-molding cavities may be formed at right and left periphery portions of the cooling cylinder in the axial direction thereof, so that the anchor members can be molded along the opposite side edge portions of the molded base member, on its surface opposite to that where the coupling elements are molded.

According to the molding apparatus, various forms of coupling elements can be molded. Specifically, in case that each coupling-element-molding opening of the extruding hole is approximately shaped like T, the form of each molded coupling element is also shaped like T. In case that the coupling-element-molding opening of the extruding hole is approximately shaped like Y, an approximately Y-shaped coupling element can be molded. Furthermore, when a tip portion of a head-portion-molding opening in each coupling-element-molding openings of the extruding hole is bent toward a base-member-molding openings, the molded coupling element can be shaped like a hook which is projecting in one direction of the molding direction from the stem portion, or it can be shaped like a palm tree which is projecting forward and rearward in the molding directions.

BRIEF DESCRIPTION OF THE DRAWINGS

FIG. 40 is a schematic side view showing a third embodiment of the apparatus of the present invention;

DESCRIPTION OF THE PREFERRED EMBODIMENT

Typical embodiments of the present invention will be specifically described below with reference to the accompanying drawings. Of course, the embodiments to be described below are only typical, by which the present invention can be best understood, and it is also clear from the following description that the present invention should not be limited to these embodiments.

Figure 1:
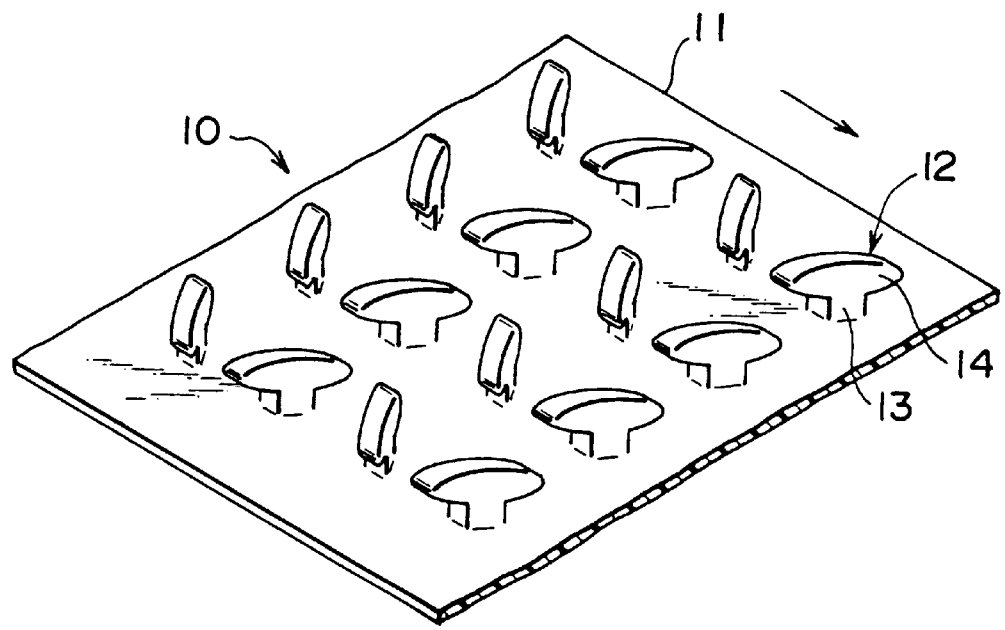
FIG. 1 is a partial perspective view showing an example of the form of a molded surface fastener according to the present invention.
Figure 2:
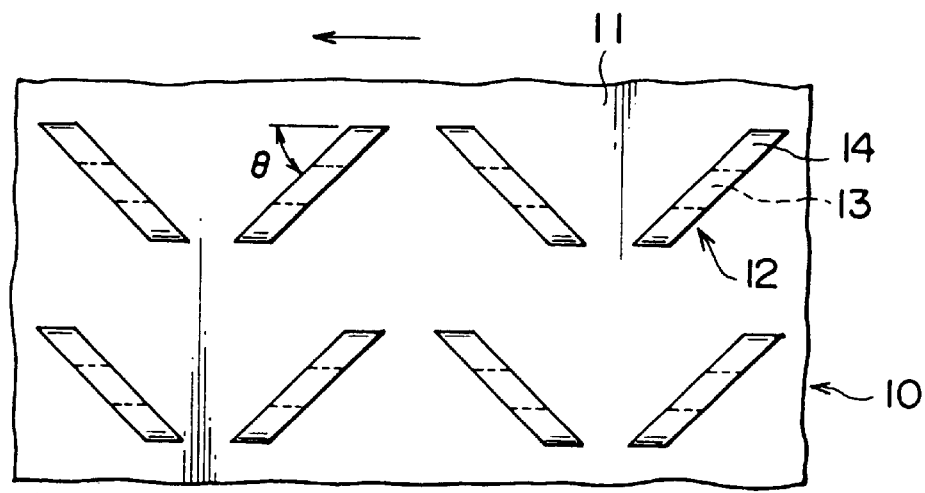
FIG. 2 is a plan view of the molded surface fastener.
Figure 3:
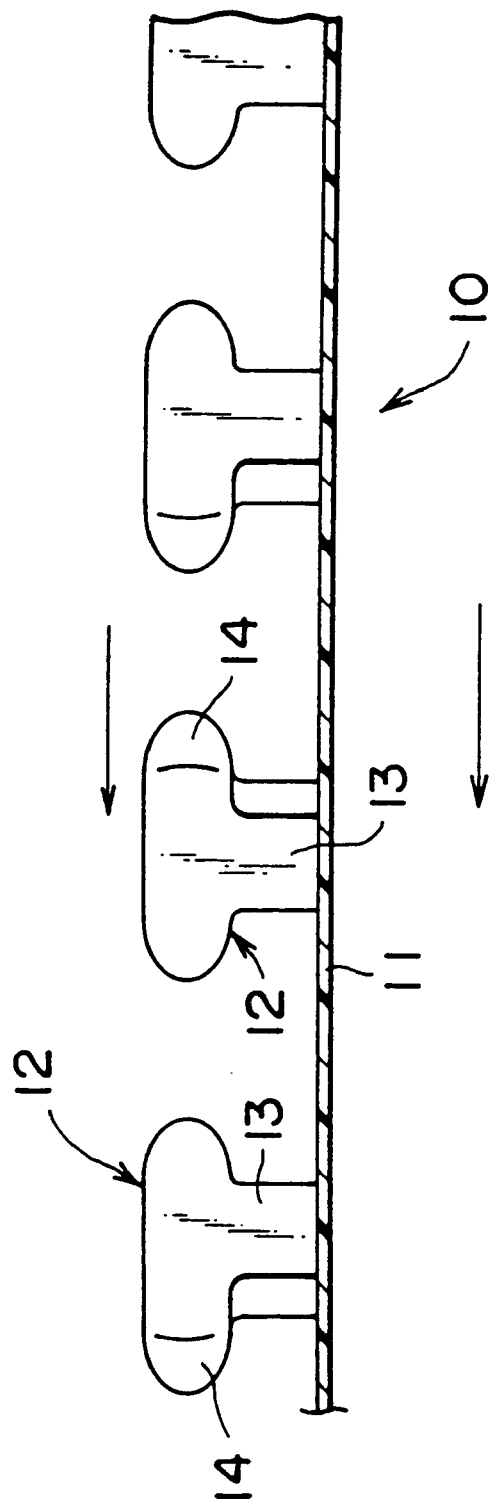
FIG. 3 is a side view of the molded surface fastener.

FIG. 1 shows a partial perspective view of a molded surface fastener equipped with coupling elements each having a typical shape according to the present invention. FIG. 2 is a top view of the surface fastener, and FIG. 3 is a side view thereof. In these FIGURES, the direction shown by an arrow shows a molding direction by the molding apparatus of the present invention. In the molded surface fastener 10 according to this first embodiment, a lot of coupling elements 12 are individually and continuously molded integrally on one surface of a sheet-like base member 11, and each coupling element 12 comprises a stem portion 13 standing from the surface of the sheet-like base member 11, and a coupling head portion 14 projecting forward and rearward in the molding direction from the tip of the stem portion 13. As shown in FIG. 1 and FIG. 2, in the plan view, all the stem portions 13 and coupling head portions 14 are shaped such that each pair of them assumes a parallelogram shape having long sides extending obliquely to the molding direction.

According to the illustrated example, an entire form of the coupling element has a substantially T-shape, and an axis of a projecting direction of each coupling head portion 14 extending obliquely to the molding direction has a predetermined angle to a straight line connecting the centers of the respective stem portions 13, so that the coupling elements 12 mutually adjacent in the molding direction are arranged in a zigzag manner. Furthermore, the adjacent engaging elements 12 are arranged in a mutually mirror symmetrical relation. On the other hand, the coupling elements 12 mutually adjacent in the direction perpendicularly to the molding direction are arranged in the same form, and are in parallel to each other.

Figure 4:
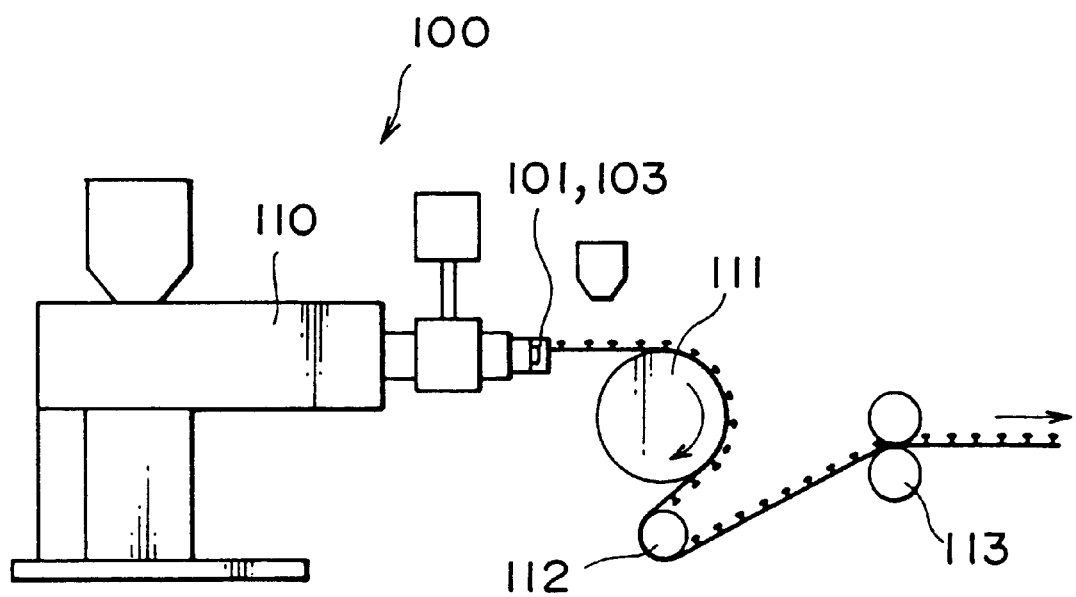
FIG. 4 is a side view showing a schematic arrangement of a molding apparatus for a molded surface fastener, which is a first embodiment of the apparatus of the present invention.
Figure 5:
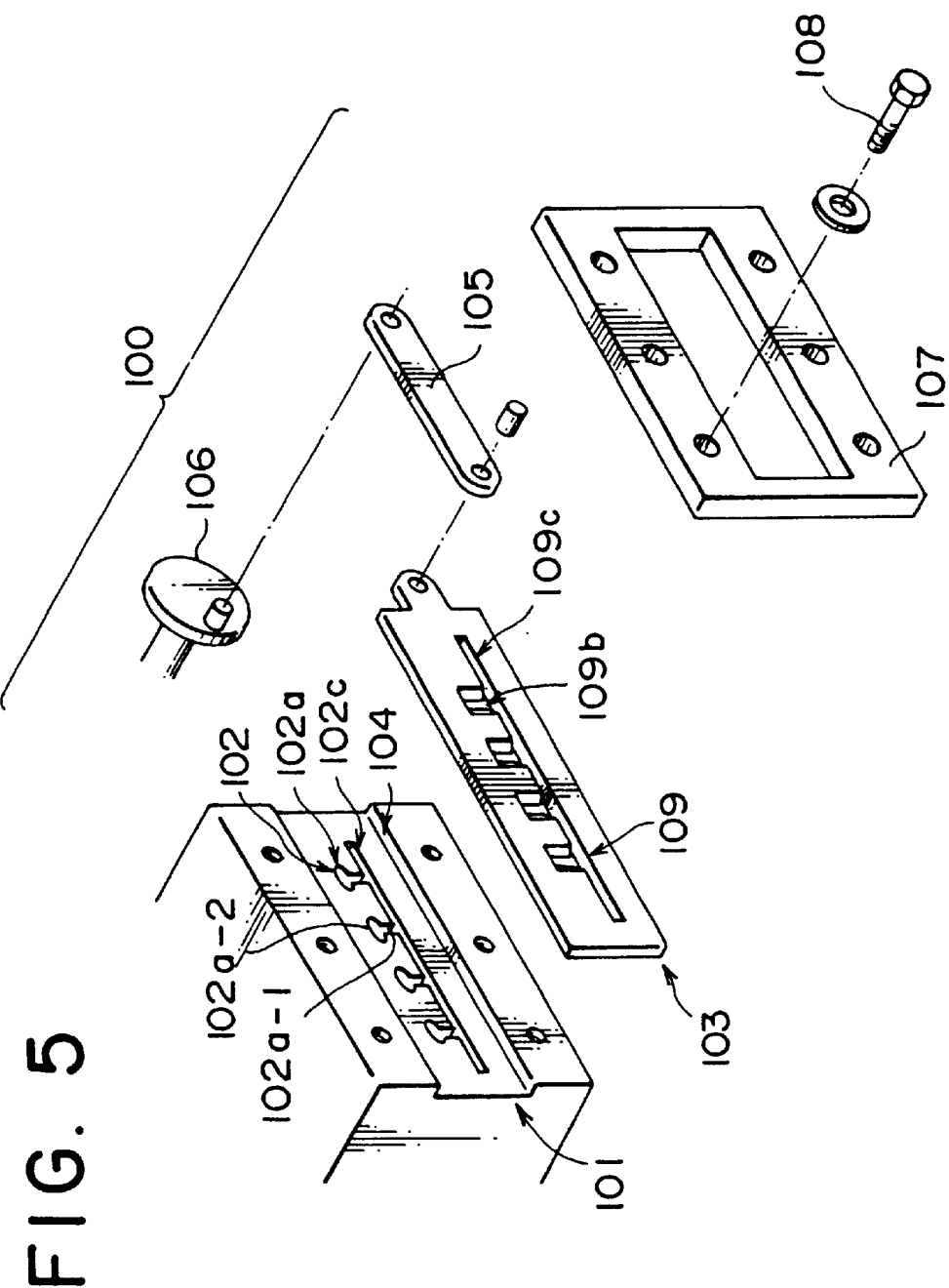
FIG. 5 is an exploded view showing a molten-resin-material-extruding-molding section of the apparatus.
Figure 6:
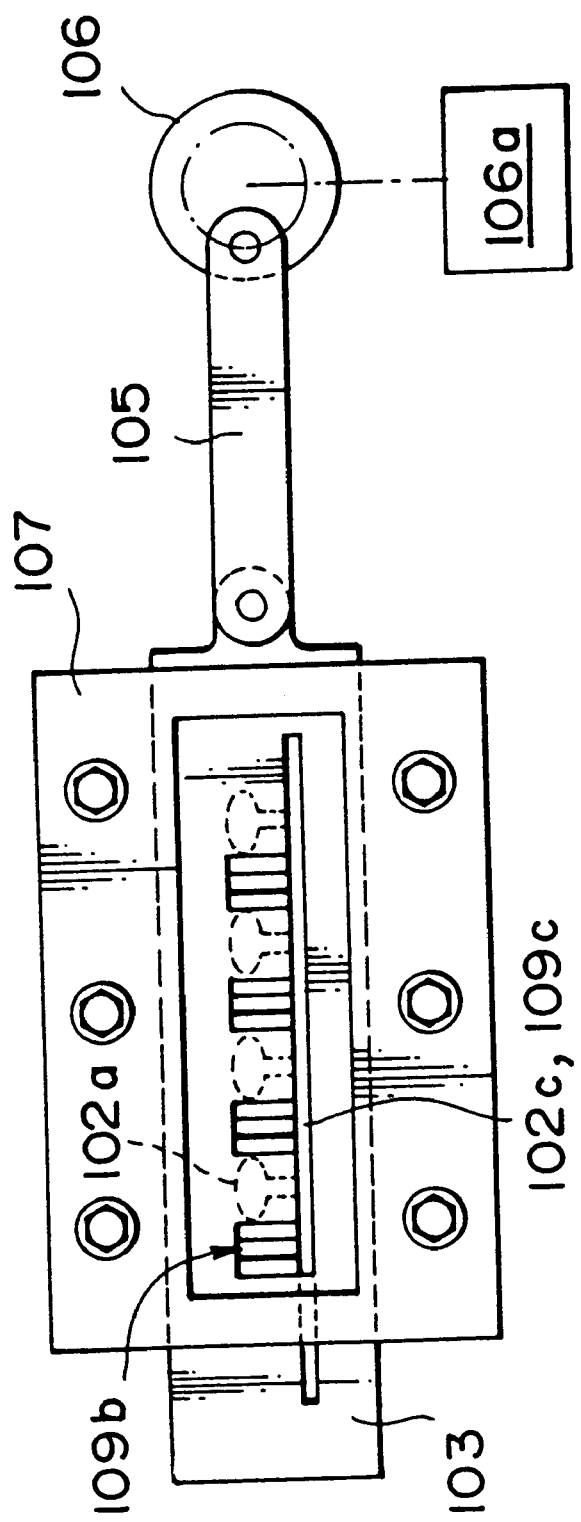
FIG. 6 is a front view showing a main section of the apparatus.
Figure 7:
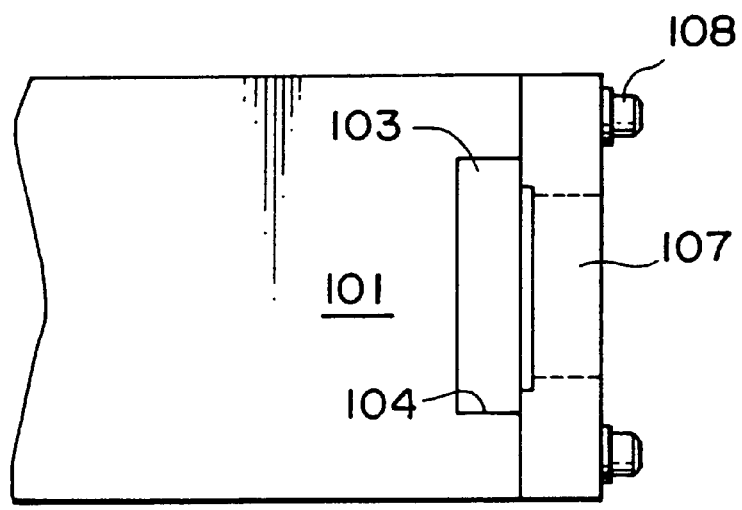
FIG. 7 is a side view of the extruding-molding section of the apparatus.
Figure 8:
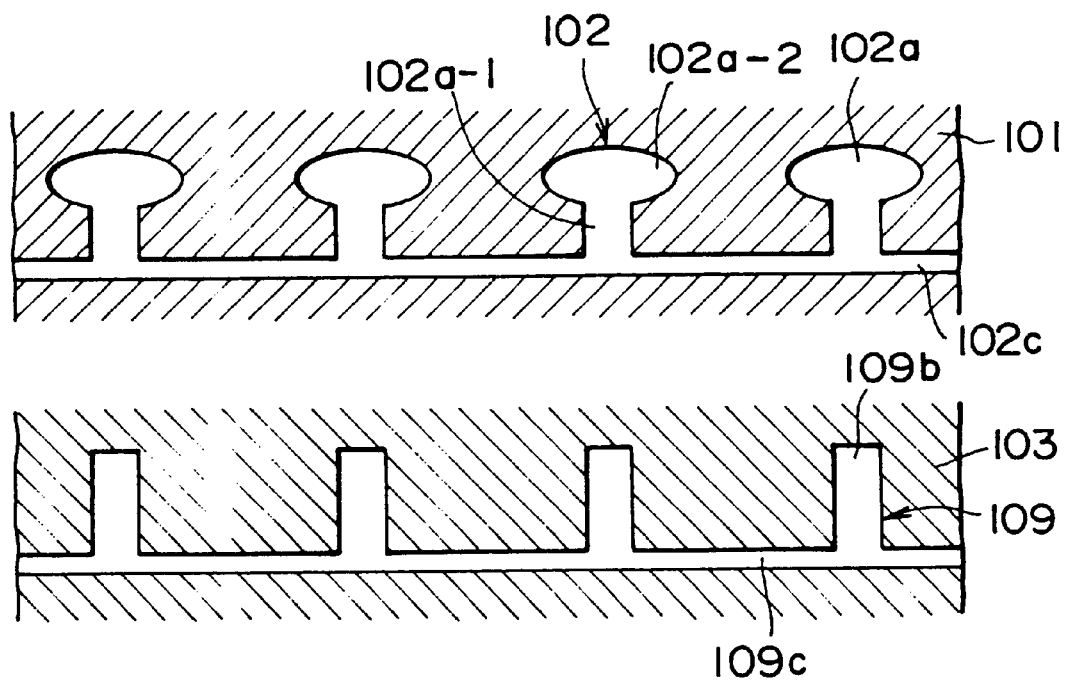
FIG. 8 is a front view showing examples of the shapes of extruding holes of a first extruding nozzle and a second extruding nozzle of the apparatus.
Figure 9:
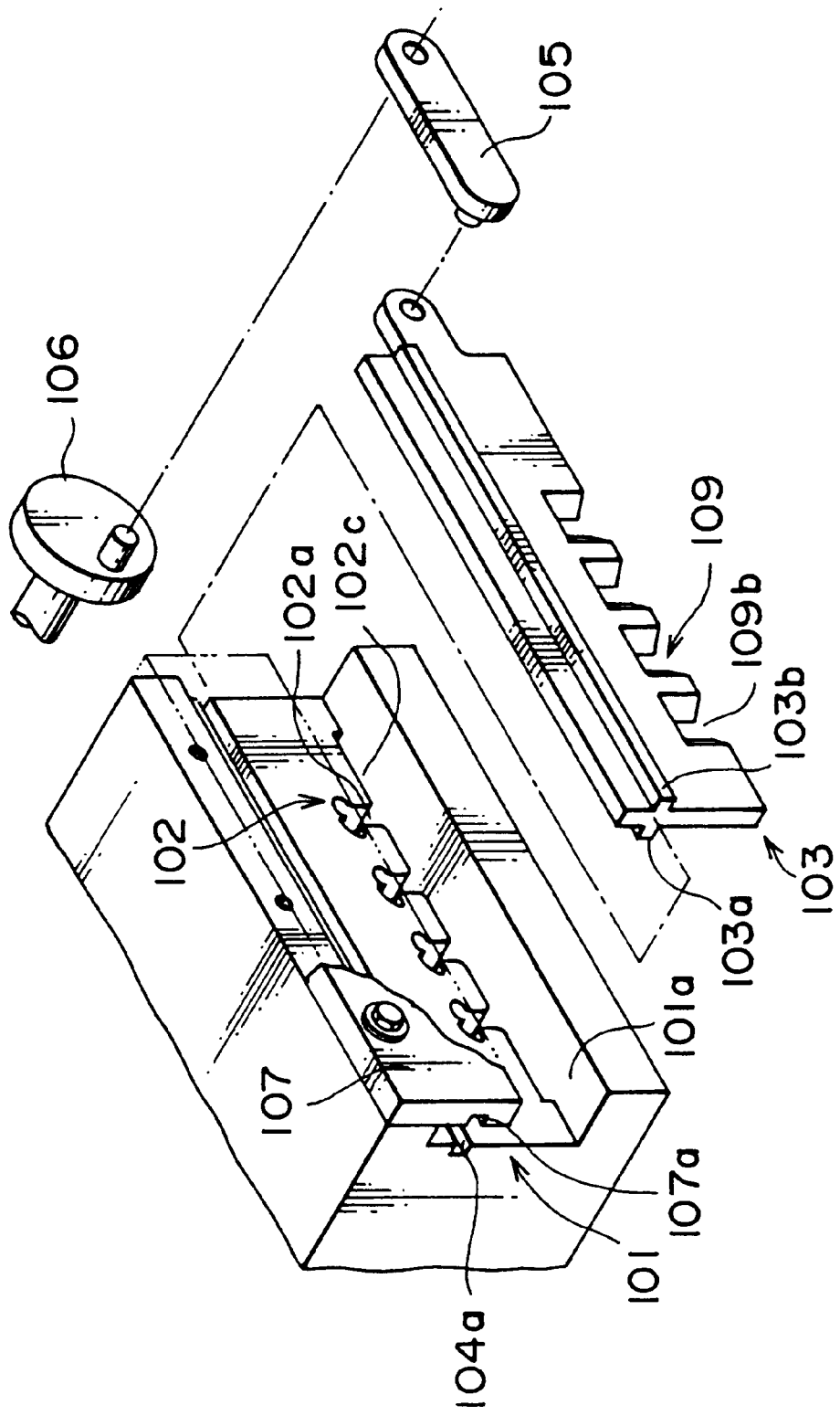
FIG. 9 is an exploded view of a modified molten-resin-material-extruding section of the apparatus.
Figure 10:
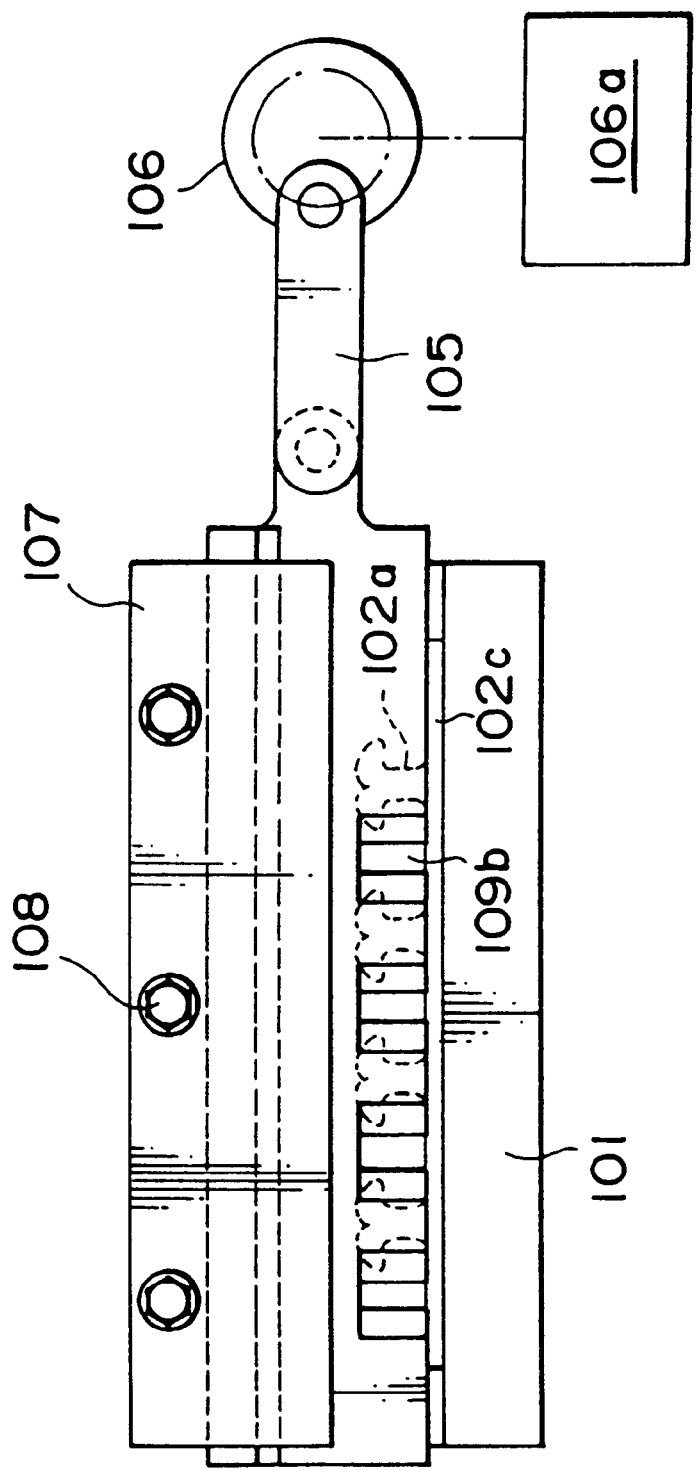
FIG. 10 is a front view showing a main section of the apparatus including the modified extruding section.
Figure 11:
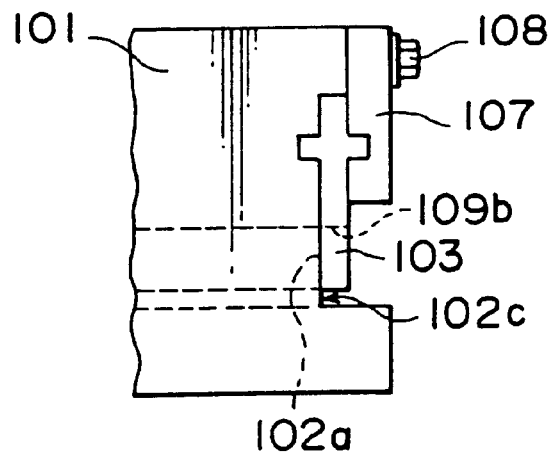
FIG. 11 is a side view of the modified extruding section of the apparatus.
Figure 12:
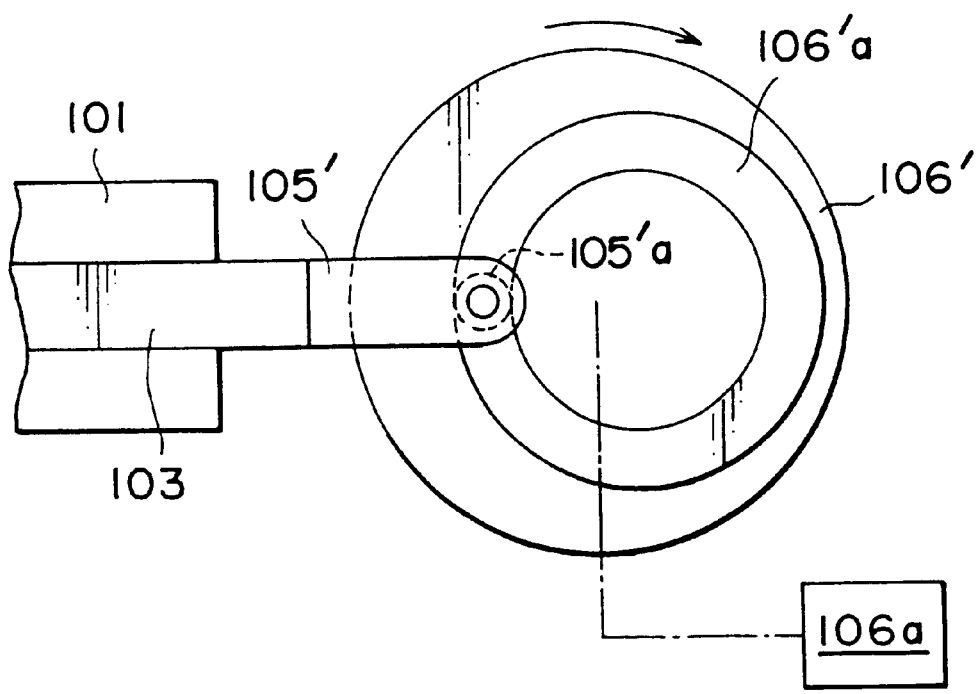
FIG. 12 is a front view showing another example of a vibrating means of the present invention.

The molded surface fastener 10 of the present invention having a form of the first embodiment is continuously and efficiently molded by molding method and apparatus according to the present invention, which are described below. FIG. 4 is a side view showing a schematic arrangement of a typical molding apparatus for a molded Surface fastener according to a first embodiment of an apparatus of the present invention. FIG. 5 is an exploded perspective view showing a molding section of the molding apparatus, FIG. 6 is a front view of the molding section, and FIG. 7 is a side view of the molding section. FIG. 8 is a front view showing an example of a shape of each extruding hole of a first extruding nozzle and a second extruding nozzle. FIG. 9 is an exploded perspective view showing a modified example of the molding section, and FIG. 10 is a front view of the modified molding section, and FIG. 11 is a side view of the modified molding section. FIG. 12 is a view explaining for the action showing another example of a vibrating mechanism of the molding apparatus according to the present invention.

The molding apparatus 100 of the present invention comprises a first extruding nozzle 101 and a second extruding nozzle 103. According to the illustrated example, the first extruding nozzle 101 composes a die of the extruding machine 110, and at the front surface of the extruding hole 102 of this first extruding nozzle 101 in the extruding direction, the second extruding nozzle 103 is horizontally arranged in a freely slidable way. This second extruding nozzle 103 performs reciprocating motion (vibration) in the horizontal direction while touching the extruding hole 102 of the first extruding nozzle 101. Therefore, in a horizontal area of the front central portion including the extruding hole 102, the first extruding nozzle 101 has a sliding groove 104, onto which second extruding nozzle 103 is fitted to be guided.

The second extruding nozzle 103 has such a shape as a rectangle to be fitted into the sliding groove 104. One end of the second extruding nozzle 103 in the longitudinal direction thereof is connected to a crank shaft 106 through a link 105. By rotating the crank shaft 106 by an driving source not shown at a given speed, the second extruding nozzle 103 slidably fitted in the sliding groove 104 slides from side to side in the sliding groove 104. FIG. 12 shows another example of an operational mechanism of the second extruding nozzle 103. As shown in the Figure, one end of the rod 105' is directly fixedly connected to one end of the second extruding nozzle 103 in the operational mechanism, and to the other end of the rod 105', a cam contact roller 105'a is connected, and the cam contact roller 105'a is rotatably inserted into a cam groove 106'a of the disk cam 106'.

In order to make the lateral movement of the second extruding nozzle 103 stable, as shown in FIG. 5, a pressing panel 107 is attached to a front surface of the first extruding nozzle 101 excluding the sliding groove 104. In the illustrated example, the pressing panel 107 is made of a rectangular frame body, and is fixed to the first extruding nozzle 101 with each vis 108. Furthermore, in order to make the sliding posture of the second extruding nozzle 103 stable, as shown in FIG. 9 to FIG. 11, a sliding guide groove 104a may be formed so as to extend along an upper end edge portion of the first extruding nozzle 101, while at the corresponding portion of the pressing panel 107, a sliding guide groove 107a may be also formed, and at the corresponding portions on both side surfaces of the second extruding nozzle 103, first and second ridges 103a, 103b are formed for being slidably fitted into the respective sliding guide grooves 104a, 107a. By fitting the first and second ridges 103a, 103b into the respective sliding guide grooves 104a, 107a, the second extruding nozzle 103 is horizontally slidably supported by the first extruding nozzle 101.

The shape of the extruding hole 102 of the extruding nozzle 101 according to these embodiments comprises, for example, as shown in FIG. 8, a plurality of coupling-element-molding openings 102a arranged at the same pitch in the width direction of the first extruding nozzle 101 and a base-member-molding opening 102c horizontally connecting the lower ends of the coupling-element-molding openings 102a. Each coupling-element-molding opening 102a has an approximately T-shape comprising a stem-portion-molding opening 102a-1 which molds a stem portion 13 of the coupling element 12 shown in FIG. 1 and is in a shape of a longitudinal rectangle, and a head-portion-molding opening 102a-2 which is laterally projecting from the upper end of the stem-portion-molding opening 102a-1. In the embodiment shown in FIG. 8, the T-shaped upper surface is formed in a circular arc respectively from the center to the right and left. The base-member-molding opening 102c is shaped like a slit which connects the lower ends of a plurality of stem-portion-molding openings 102a-1, and the vertical size thereof is approximately equal to the thickness of the molded base member 11.

On the other hand, an extruding hole 109 of the second extruding nozzle 103 shown in FIG. 8 comprises a plurality of longitudinal rectangular openings 109b which are arranged at the same pitch as the coupling-element-molding openings 102a and have a height equal to or more than that of the coupling-element-molding openings 102a, and a slit-like communicating section 109c communicates with the lower ends of the respective rectangular openings 109b.

This communicating section 109c is positioned so as to communicate with the base-member-molding opening 102c of the first extruding hole 102, and the vertical size thereof is equal to that of the base-member-molding opening 102c, or is a little larger than that. Accordingly, this communicating section 109c is also a molding opening for the base member 11.

Alternatively, according to the embodiment shown in FIG. 9, the extruding hole 109 of the second extruding nozzle 103 only has a longitudinal rectangular opening 109b, and it is merely arranged like teeth of a comb, without forming a slit-like communicating section 109c. Then, the height of the longitudinal rectangular opening 109b is equal to that of the coupling-element-molding opening 102a, and it has such a shape that the slit-like communicating section 109c in the embodiment shown in FIG. 8 is horizontally cut at the upper end edge thereof.

Furthermore, in these embodiments, the periphery of the coupling-element-molding opening 102a of the first extruding nozzle 101 is formed to be a flat surface in parallel with the extruding direction. And as mentioned above, the first extruding nozzle 101 is fixedly attached to the front surface of the extruding machine 110. The second extruding nozzle 103 is horizontally reciprocated while touching the front surface of the first extruding nozzle 101. In order to perform this reciprocation, the vibrating mechanism is connected to the second extruding nozzle 103, and the periphery of the longitudinal rectangular opening 109b of the second extruding hole 109 has a tapered surface gradually enlarged in the extruding direction thereof. In the embodiment shown in FIG. 9, there is a guide section 101a which is continuous with a bottom surface of the base-member-molding opening 102c and projects forward in the extruding direction from the first extruding nozzle 101 for guiding the base member 11 extrusion-molded in the molding direction.

Now, a molding principle when molding a molded surface fastener 10 having a form shown in FIG. 1 by the surface fastener molding apparatus as described above will be described with reference to FIG. 13 to FIG. 19. Molten resin Mr extruded from the extruding machine 110 pass through the extruding hole 102 of the first extruding nozzle 101. At this time, the second extruding nozzle 103 is simultaneously reciprocating in the right and left direction while touching the front surface of the first extruding nozzle 101.

Figure 13A:
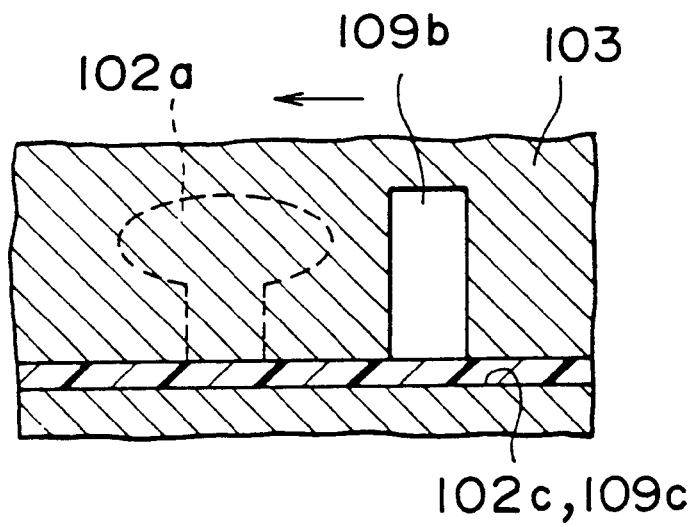
FIGS. 13A and 13B are views for explaining a first stage of a molding principle of a molded surface fastener according to the first embodiment of the apparatus of the present invention.
Figure 13B:
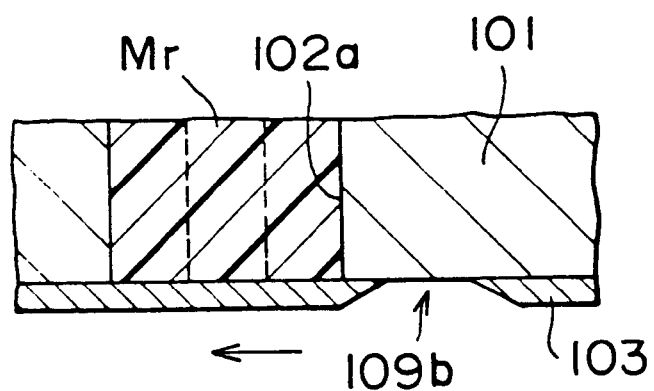
Figure 14A:
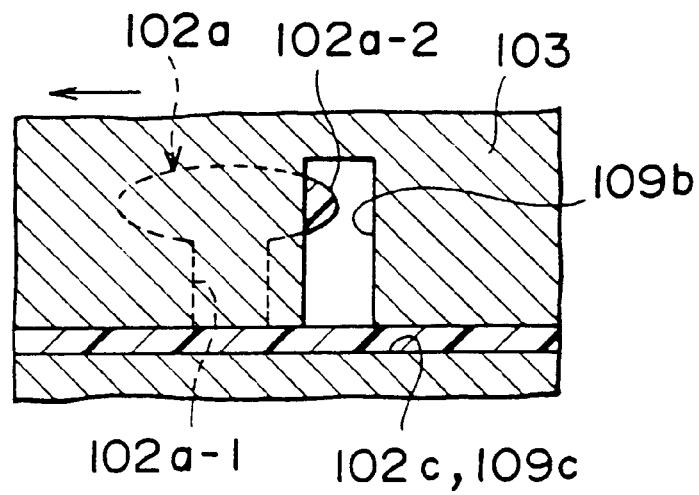
FIGS. 14A and 14B are views for explaining a second stage of the molding principle.
Figure 14B:
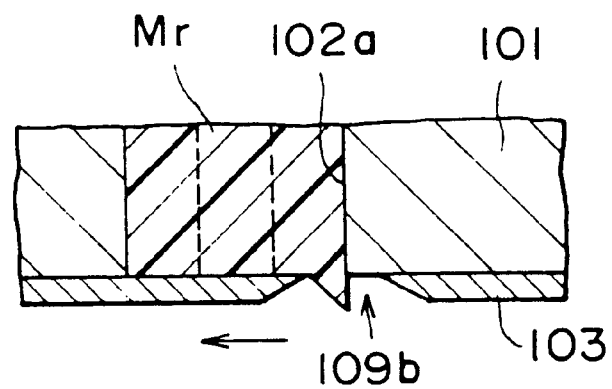
Figure 15A:
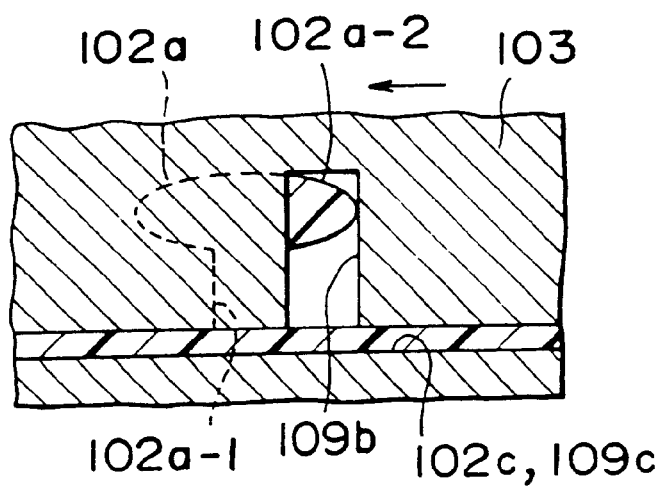
FIGS. 15A and 15B are views for explaining a third stage of the molding principle.
Figure 15B:
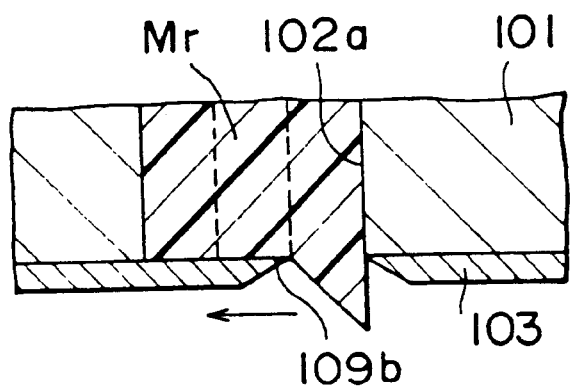

Now, the second extruding nozzle 103 is sliding in a direction of the arrow shown in FIG. 13, and it continues its sliding movement in the same direction even after the rectangular opening 109b of the second extruding hole 109 has reached an end portion of the head-portion-molding opening 102a-2 of the first extruding hole 102 (see FIG. 14A). An crossing area where it crosses with the projecting portion on one side of the head-portion-molding opening 102a-2 is gradually increased until reaching the stem-portion-molding opening 102a-1. The molten resin Mr, of which passage is prevented by a part of the second extruding nozzle 103 where the second extruding hole 109 is not formed, gradually increases its amount, so that the form of the projecting part on the one side of the coupling head portion 14 may be shaped like a wedge having a pointed end portion (see FIG. 15B).

Figure 16A:
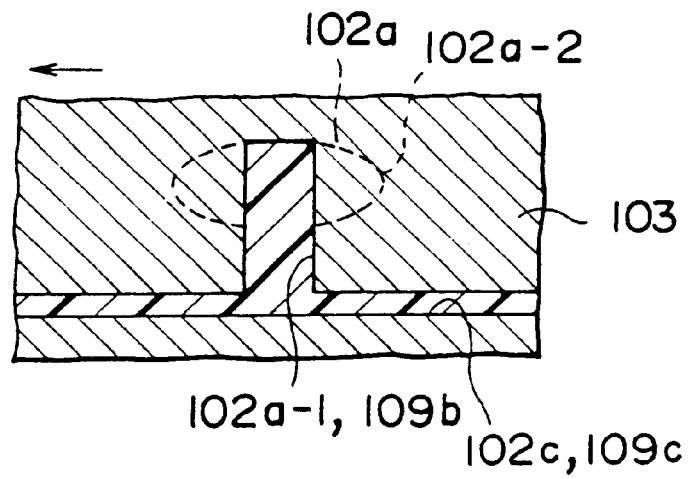
FIGS. 16A and 16B are views for explaining a fourth stage of the molding principle.
Figure 16B:
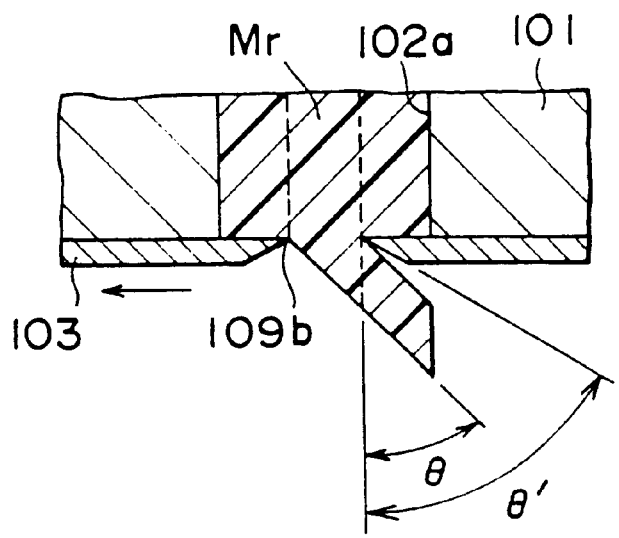
Figure 17A:
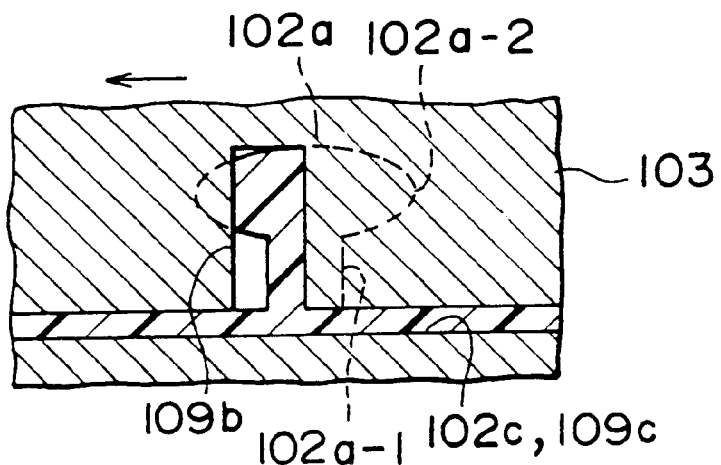
FIGS. 17A and 17B are views for explaining a fifth stage of the molding principle.
Figure 17B:
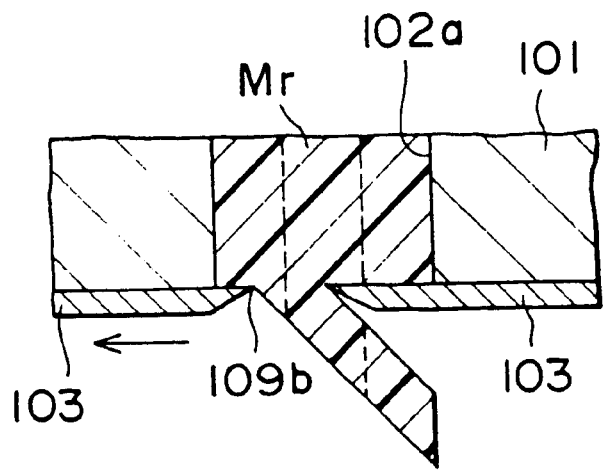

Next, when the rear end portion in the sliding direction of the longitudinal rectangular opening 109b passes the end portion of the head-portion-molding opening 102a-2, and continues to slide to the stem-portion-molding opening 102a-1, as shown in FIG. 16B, the head-portion-molding opening 102a-2 and stem-portion-molding opening 102a-1 are closed in turn by the rear end portion of the rectangular opening 109b in the sliding direction. Then, as shown in FIG. 17B and FIG. 18B, a coupling element 12 is molded to have a crossed axes angle θ to the molding direction in the plan view. The crossed axes angle θ at this time is determined by a sliding speed of the second extruding nozzle 103.

When the second extruding nozzle 103 continues to move so as to cross the stem-portion-molding opening 102a-1, at first, the amount of resin passing through the rectangular opening 109b is gradually increased. In the state where the rectangular opening 109b is overlapped onto the stem-portion-molding opening 102a-1 (see FIG. 16), the respective side half portions of a coupling head portion 14 and a stem portion 13 each having a cross section of a parallelogram inclined with a certain tilt angle to the resin extruding direction are molded.

Figure 18A:
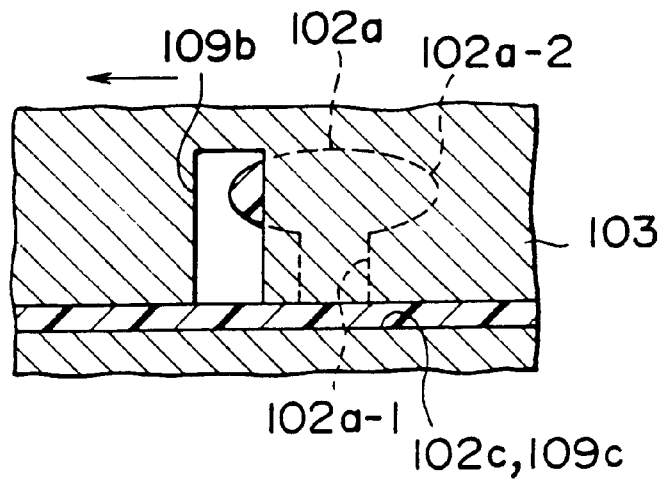
FIGS. 18A and 18B are views for explaining a sixth stage of the molding principle.
Figure 18B:
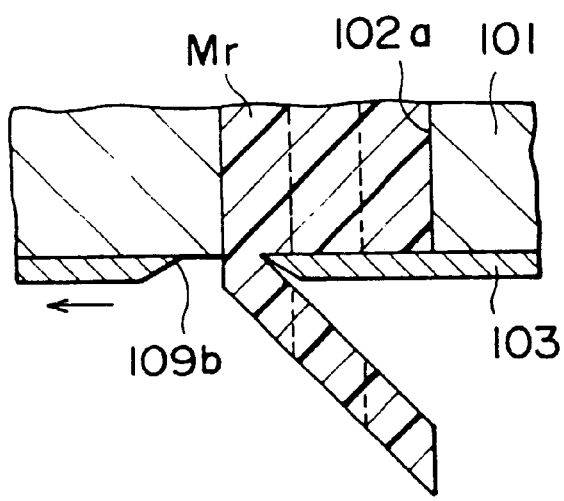
Figure 19A:
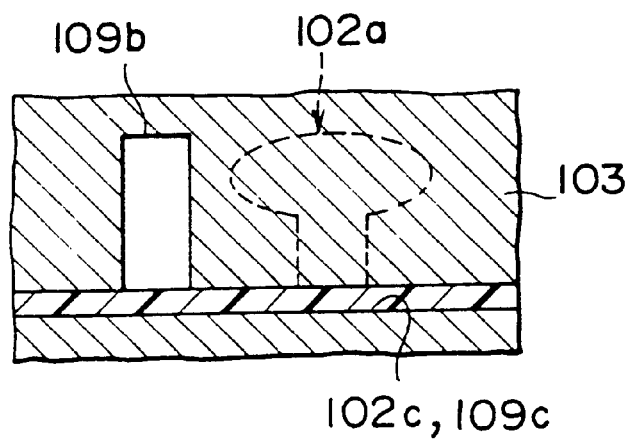
FIGS. 19A and 19B are views for explaining a seventh stage of the molding principle.
Figure 19B:
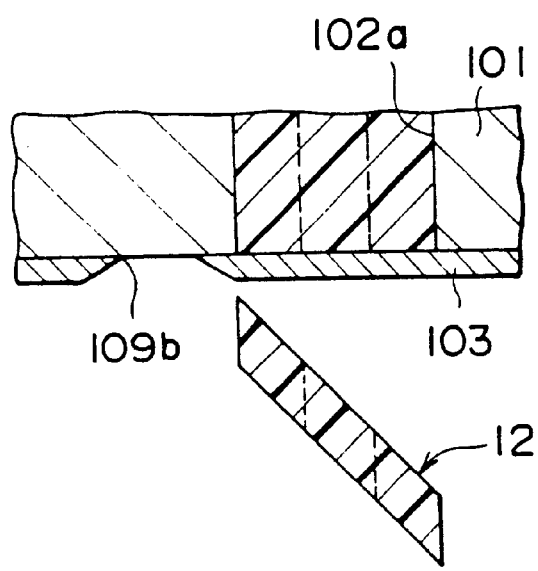

Furthermore, when the rectangular opening 109b continues to move in the same direction and pass the stem-portion-molding opening 102a-1, the amount of resin passing through the rectangular opening 109b is gradually decreased according to a shape of the projecting part on the other side of the head-portion-molding opening 102a-2 and the overlapped part, and the other side half portion of the cross section of the parallelogram shape is formed (see FIG. 18). Finally, when the rectangular opening 109b completely passes the coupling-element-molding opening 102a, the molding of a single coupling element 12 is completed (FIG. 19). The shape of the parallelogram at this time is formed by long sides having the crossed axes angle θ with respect to the molding direction and short sides in parallel with the molding direction.

In the present embodiment, as mentioned above, the periphery of the rectangular opening 109b is made to have a tapered surface. The tilt angle θ' made between the tapered surface and the molding direction is set to be larger than the crossed axes angle θ, and therefore, as shown clearly in FIG. 16 to FIG. 18, when the rectangular opening 109b of the second extruding nozzle 103 moves while crossing the coupling-element-molding opening 102a of the first extruding nozzle 101 and a rear end edge in the sliding direction of the rectangular opening 109b sequentially closes the coupling-element-molding openings 102a, the molten resin previously extruded from the rectangular opening 109b is prevented from being crushed by the rear end of the rectangular opening 109b, so that a well-balanced and stable form of a coupling element can be molded.

When the above operation has finished and a single coupling element 12 is molded, the second extruding nozzle 103 starts to move in an opposite direction of the previous sliding direction. During this movement in the opposite direction, a plurality of coupling elements 12 each having a cross section of a parallelogram are molded transversely in one row, in a form reversely to the coupling element 12 molded during the previous sliding, that assumes a mirror symmetrical form. When the coupling elements 12 are molded in this way, since the circumferential inner surface of each longitudinal rectangular opening 109b of the second extruding nozzle 103 is made to have a tapered surface gradually expanding toward the extruding direction, the molten resin Mr extruded from the first extruding nozzle 101 can be molded to be a desired form without being crushed by the periphery of the longitudinal rectangular opening 109b even after passing through the longitudinal rectangular opening 109b.

Then, as for a single coupling element 12, not only during the time from start to end of the molding but also during the molding of the next coupling element 12, the base-member-molding opening 102c of the first extruding nozzle 101 always communicates with the communicating section 109c of the second extruding nozzle 103 through a whole length thereof, and accordingly, the sheet-like base member 11 extruded from the base-member-molding opening 102c is continuously molded together with the molding of the coupling element 12 with the same molding width. Therefore, the lateral length of the communicating section 109c is set to be longer than that of the base-member-molding opening 102c in the lateral direction by a width of at least one piece of the coupling-element-molding opening 102a.

Thus, each time the second extruding nozzle 103 repeats its reciprocating motion, a plurality of coupling elements 12 arranged laterally in one row and a base member 11 are simultaneously and integrally molded, and a molded surface fastener 10 of the present invention is continuously molded, which comprises a base member 11 with a desired length and a desired number of pieces of coupling elements 12. In the molded surface fastener, the coupling elements 12 are arranged in a zigzag manner with a certain crossed axes angle θ with respect to the molding direction, as shown in FIG. 1. All the coupling elements adjacent in the width direction of the surface fastener 10 perpendicularly to the extruding direction are arranged in parallel having the same tilt angle θ.

The molded surface fastener 10 which is extruded from the second extruding nozzle 103 and is continuously molded, is next introduced to a peripheral surface of a cooling cylinder 111 rotating in one direction as shown in FIG. 4, and after being accompanied through a half rotation, it is picked up by a pick-up roller 112, and is sent out to the next step or the winding section through a feed roller 113.

FIG. 20 to FIG. 25 show various examples of the coupling elements of the surface fasteners 10 molded by the molding apparatus. The shapes of the coupling elements 12 shown in these FIGURES are determined by the shape of the coupling-element-molding openings 102a of the first extruding nozzle 101, each being in a shape substantially equal to the shape of the coupling-element-molding opening 102a.

Figure 20:
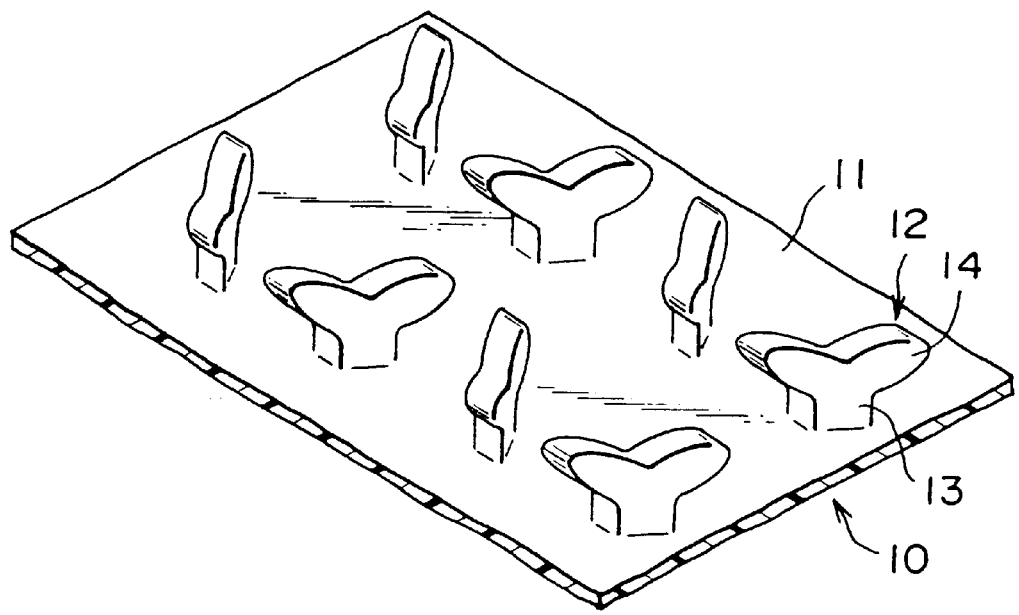
FIG. 20 is a view showing a modified example of the molded surface fastener.
Figure 21:
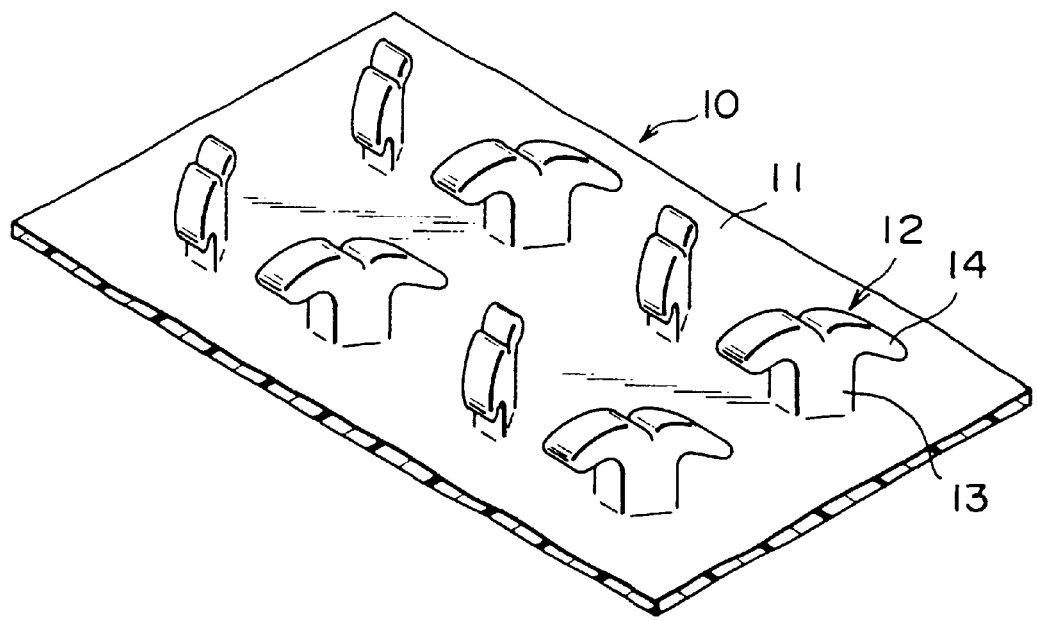
FIG. 21 is a view showing another modified example of the molded surface fastener.
Figure 22:
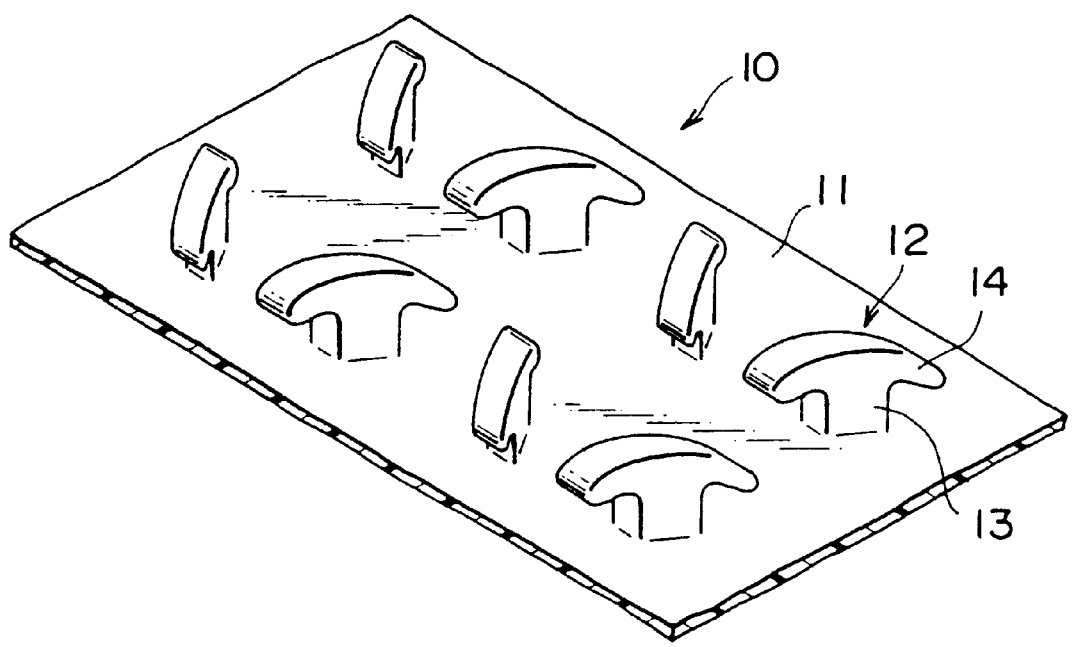
FIG. 22 is a view showing still another modified example of the molded surface fastener.
Figure 23:
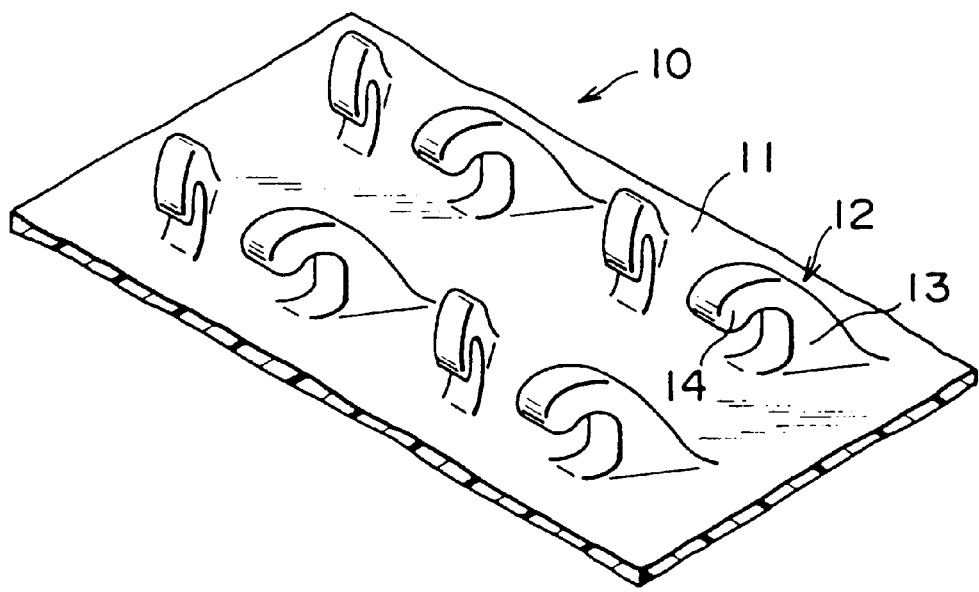
FIG. 23 is a view showing still another modified example of the molded surface fastener.

In order to obtain a coupling element in approximately a Y-shape as shown in FIG. 20, merely the shape of the coupling-element-molding opening 102a is made to be in approximately a Y-shape. Furthermore, in a case of obtaining a coupling element shaped approximately like a palm tree shown in FIG. 21, the shape of the coupling-element-molding opening 102a is made approximately like a palm tree, and in a case of molding a coupling element shaped like a palm tree or a hook in which the coupling head portion 14 is bent toward a surface of the base member 11 as shown in FIG. 22 and FIG. 23, merely the shape of the coupling-element-molding opening 102a is made to be such a shape, similarly.

Figure 24:
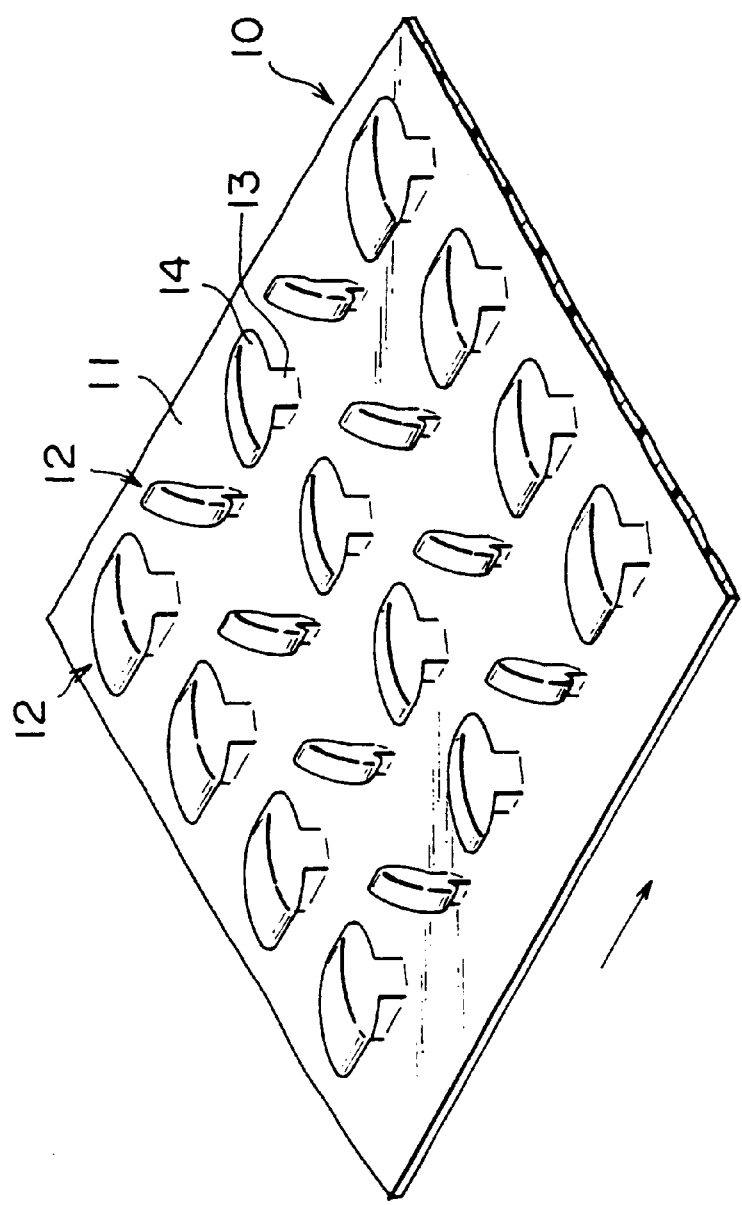
FIG. 24 is a partial perspective view showing an example of a form of the molded surface fastener in which the coupling elements having different thickness in the molding direction are mixedly molded.
Figure 25:
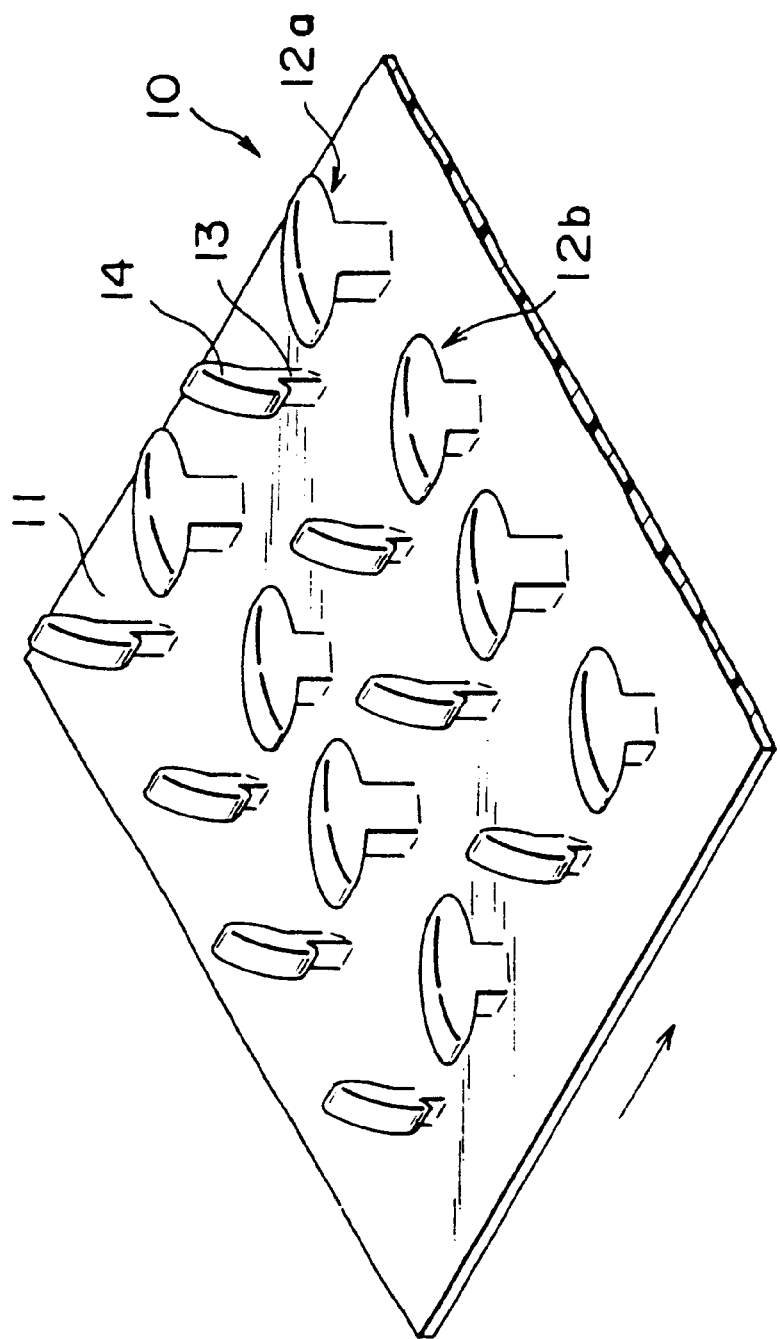
FIG. 25 is a partial perspective view showing an example of a form of the molded surface fastener in which the heights of a plurality of the coupling elements arranged laterally in a row are different.

Furthermore, in a case where the vibration speed is regularly changed by the control apparatus 106a in the molding apparatus, it is also possible, for example, as shown in FIG. 24, to change the respective thickness in the molding direction of the stem portion 13 and coupling head portion 14 of the coupling element 12, or it is also possible, for example, as shown in FIG. 25, to simultaneously mold coupling elements different in height, by changing the heights of the coupling-element-molding openings 102a arranged laterally. As shown in FIG. 25, in a case where coupling elements 12a, 12b having different heights are molded on the sheet-like base member 11, even if the loops of a mating female member are different in height, they can be coupled while complementing each other, so that the coupling force may be improved. These illustrated examples are typical. For example, in a case of randomly changing the vibration speed in the control of the vibration speed by the control apparatus 106*a* without regularly changing it as mentioned above, the coupling elements 12 mutually adjacent in the molding direction also randomly changes the thickness.

Figure 26:
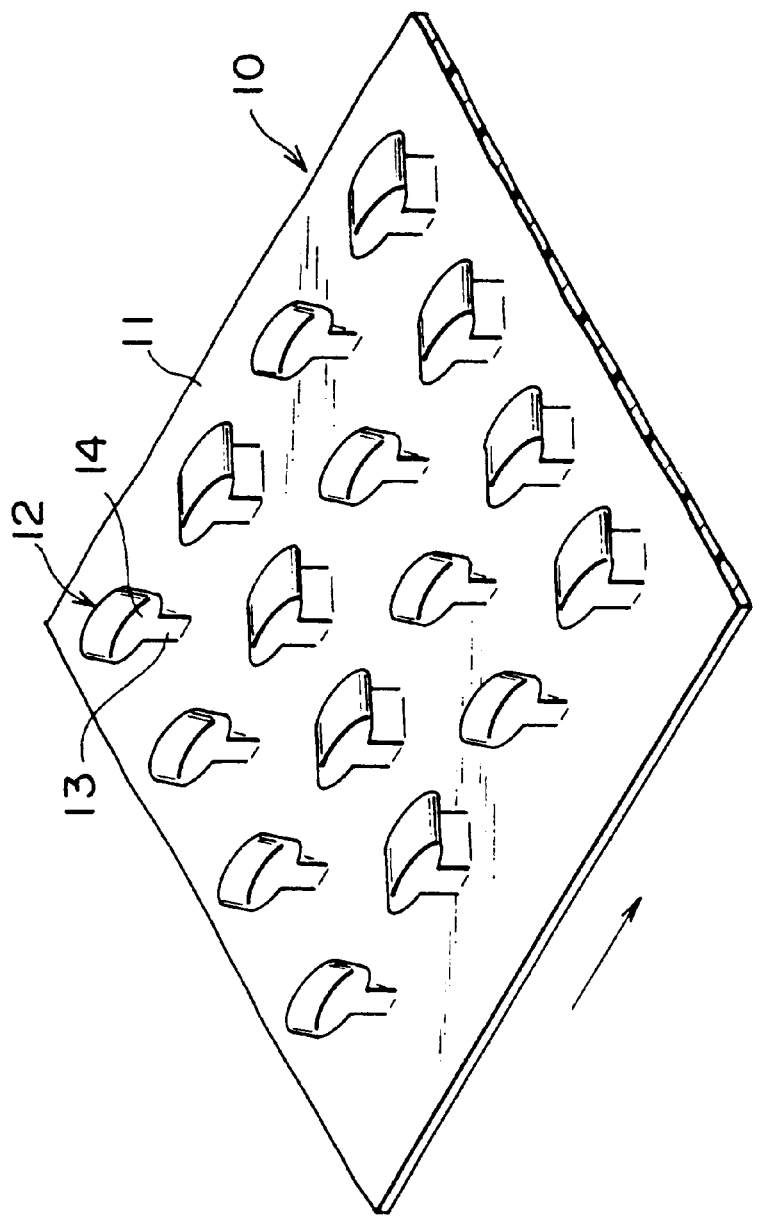
FIG. 26 is a partial perspective view showing a form of a molded surface fastener according to a second embodiment of the apparatus of the present invention.
Figure 27:
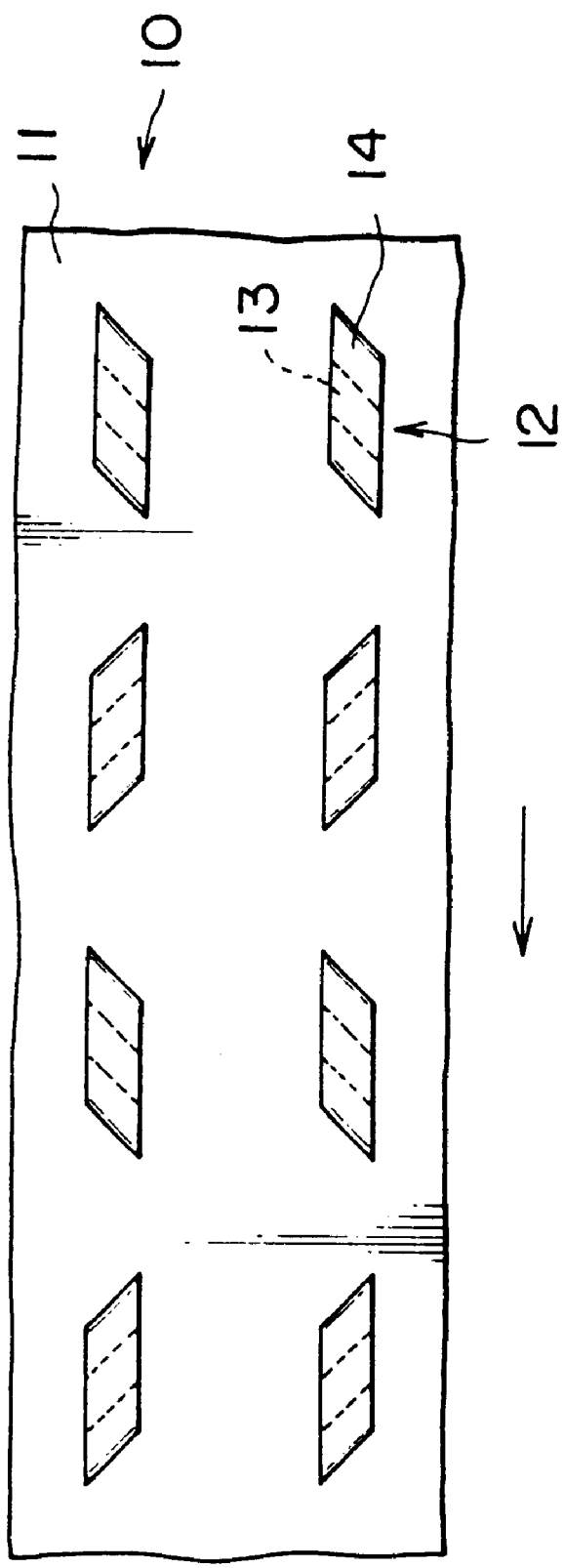
FIG. 27 is a partial plan view of the molded surface fastener.
Figure 28:
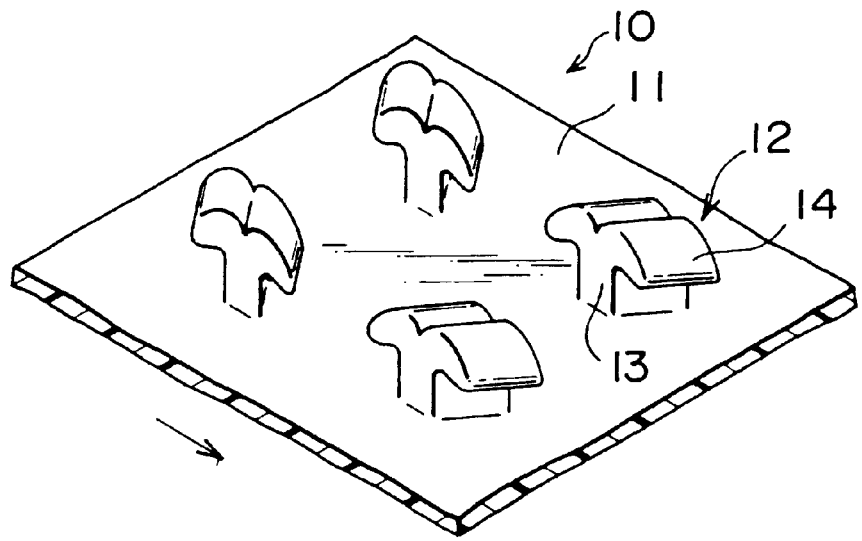
FIG. 28 is a partial perspective view showing a modified example of the molded surface fastener.
Figure 29:
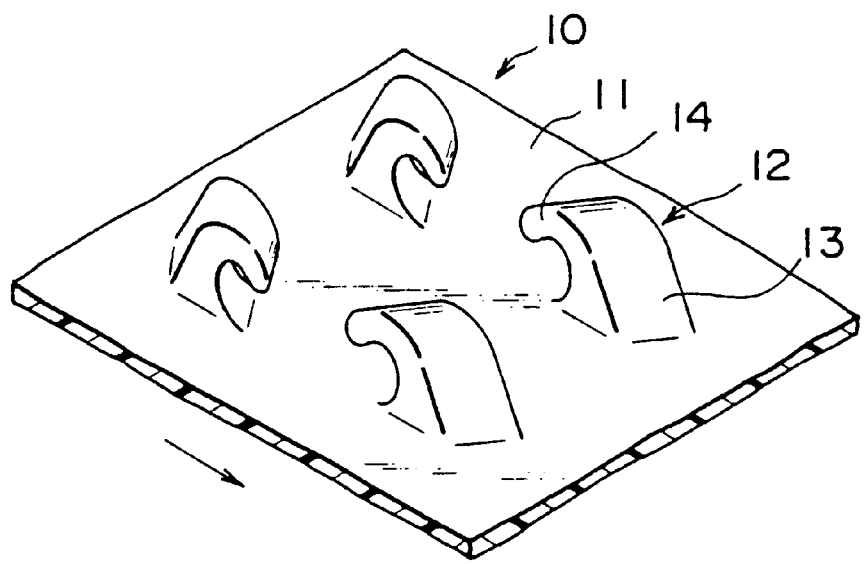
FIG. 29 is a partial perspective view showing another modified example of the molded surface fastener.

The molded surface fasteners 10 shown in FIG. 26 to FIG. 31 are molded by a molding method according to a second embodiment of a molding apparatus of the present invention, which is different from the method according to the first embodiment of the molding apparatus of the present invention. These molded surface fasteners 10 are not arranged in a zigzag manner, unlike the above mentioned fasteners, but all the respective coupling elements 12 are arranged straight on a line in parallel with the molding direction. That is, the coupling head portion 14 of each coupling element 12 is projecting in parallel with the molding direction. However, according to these embodiments, for example, as shown in FIG. 26 and FIG. 27, the coupling elements 12 mutually adjacent in the molding direction and arranged on one straight line are also molded to be approximately parallelograms and mirror symmetrical in the plan view similarly to those of the previous embodiment. However, the long sides of each parallelogram is parallel to the molding direction. Furthermore, each of the short sides is formed to have a certain crossed axes angle θ with respect to the molding direction. Furthermore, the short sides mutually adjacent in the molding direction are in a zigzag state similarly to the foregoing embodiment. FIG. 28 to FIG. 31 show that in the present example, it is possible to mold the coupling elements 12 having various forms similarly to the foregoing embodiment.

All forms of the coupling elements 12 as described above are special forms which are formed by the molding method and apparatus of the present invention. Furthermore, all the coupling elements 12 according to the present invention are independently molded and integrally on the surface of the sheet-like base member 11, so that an entire shape of each coupling element 12 is made to have roundness, thus giving a smooth feel of touch, when compared with a conventional coupling element obtained by the rib cutting and base material drawing.

The forms of coupling elements shown in the FIG. 26 to FIG. 31 can be obtained only by replacing the first extruding nozzle 101 and the second extruding nozzle 103 in the first embodiment of the apparatus. That is, in the present example, the formation is performed such that a part of the extruding hole 102 of the first extruding nozzle 101 is made to have a longitudinal rectangular opening 102*b*, and a part of the extruding hole 109 of the second extruding nozzle 103 is made to be a coupling-element-molding opening 109*a*.

Now, a molding principle of a molded surface fastener having a form shown in FIG. 26 will simply be described with respect to FIG. 32 to FIG. 39. The molten resin Mr extruded from the extruding machine 110 pass through the extruding hole 102 of the first extruding nozzle 101. At this time, the second extruding nozzle 103 thereof is laterally reciprocating while touching a front surface of the first extruding nozzle 101 in the fixed state.

Figure 32A:
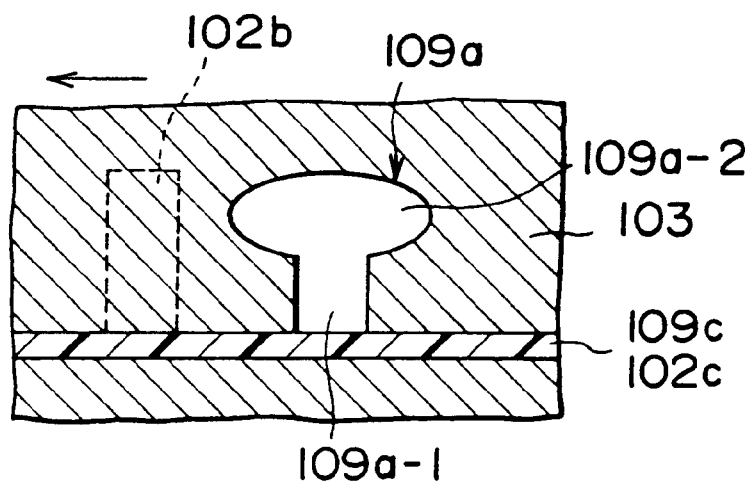
FIGS. 32A and 32B are views for explaining a first stage of a molding principle of the molded surface fastener according to the second embodiment of the apparatus of the present invention.
Figure 32B:
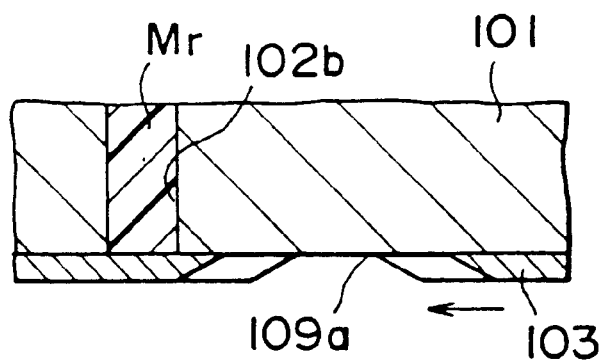
Figure 33A:
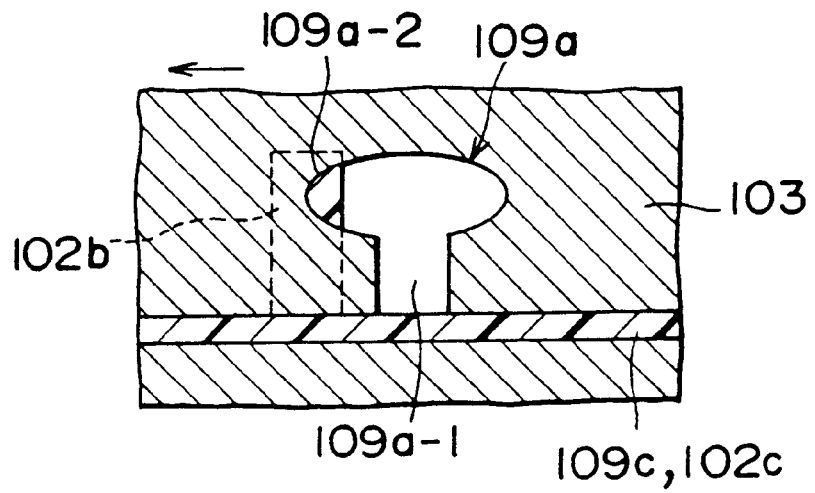
FIGS. 33A and 33B are views for explaining a second stage of the molding principle.
Figure 33B:
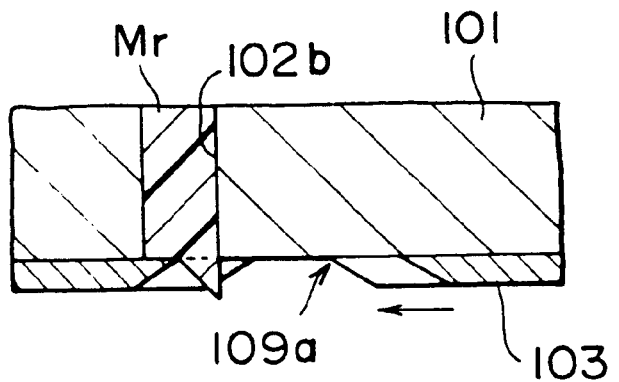
Figure 34A:
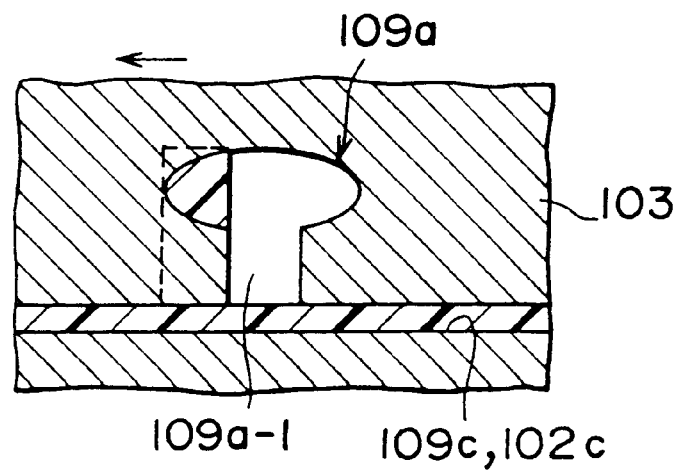
FIGS. 34A and 34B are views for explaining a third stage of the molding principle.
Figure 34B:
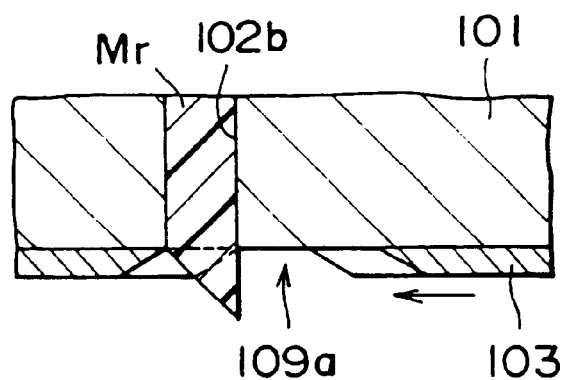

Now, the second extruding nozzle 103 is sliding in a direction of the arrow shown in FIG. 32, and even after a head-portion-molding opening 109*a*-2 of the coupling-element-molding opening 109*a* of the second extruding hole 109 thereof has reached an end portion of the rectangular opening 102*b* of the first extruding hole 102, it further continues the sliding movement in that direction (see FIG. 33A). Until a stem-portion-molding opening 109*a*-1 thereof reaches the rectangular opening 102*b*, a crossing area where a projecting part on one side of the head-portion-molding opening 109*a*-2 is gradually increased, so that the amount of the molten resin Mr is gradually increased. Then, a form of the projecting part on the one side of the coupling head portion 14 thereof is molded to have a wedge shape comprising a pointed end portion, in which its short side has a certain crossed axes angle θ with respect to the molding direction, and its long side is a straight line in parallel with the molding direction (see FIG. 34B).

Figure 35A:
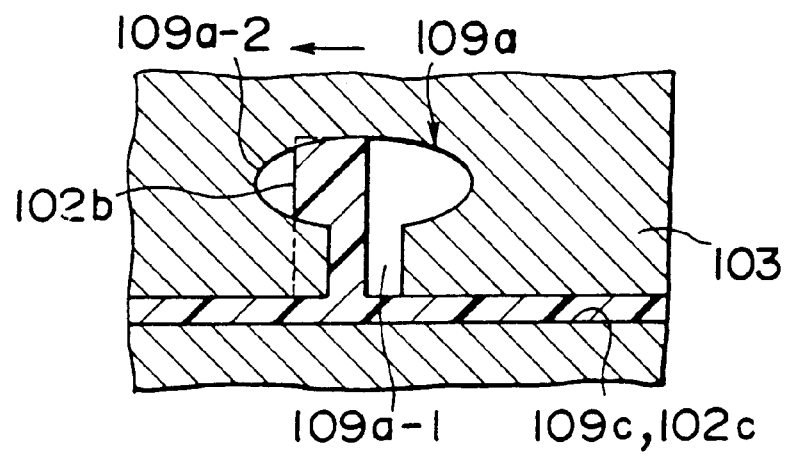
FIGS. 35A and 35B are views for explaining a fourth stage of the molding principle.
Figure 35B:
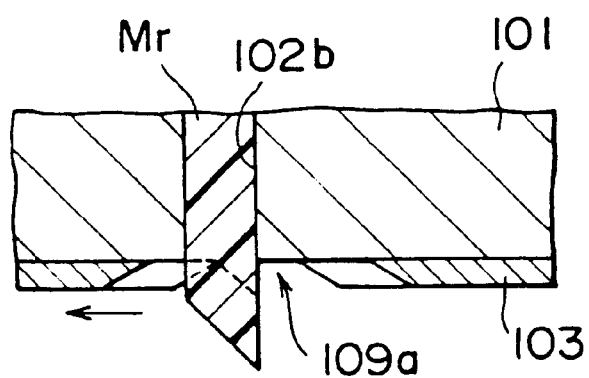
Figure 36A:
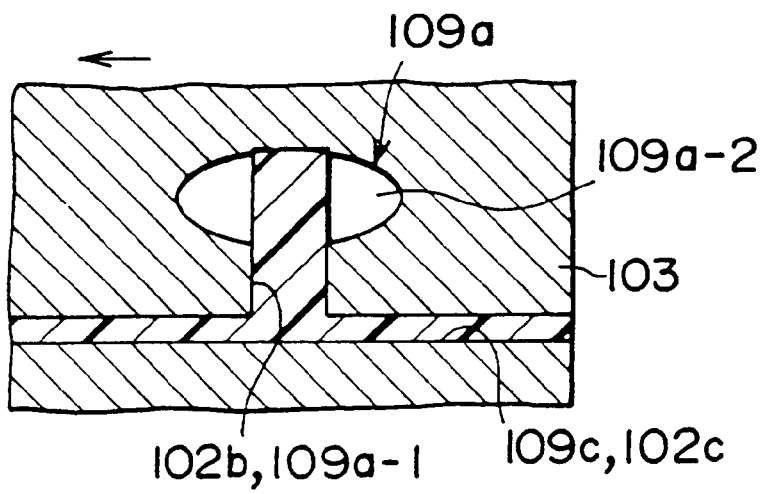
FIGS. 36A and 36B are views for explaining a fifth stage of the molding principle.
Figure 36B:
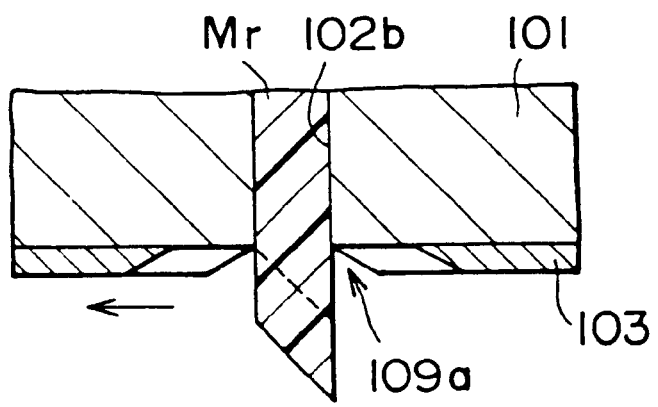
Figure 37A:
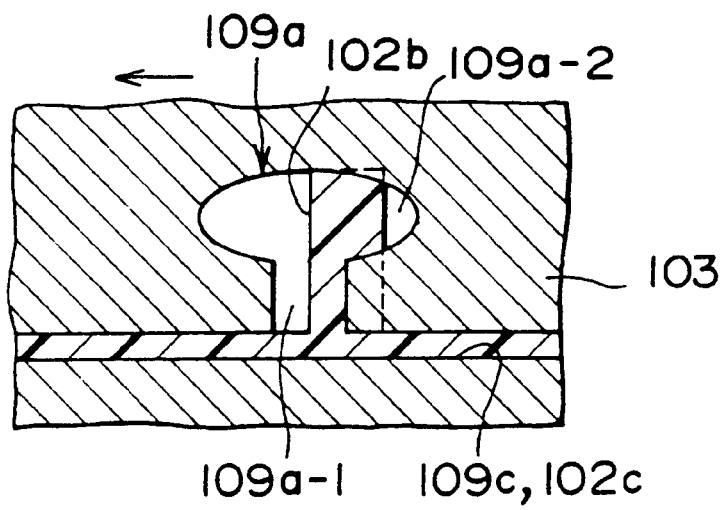
FIGS. 37A and 37B are views for explaining a sixth stage of the molding principle.
Figure 37B:
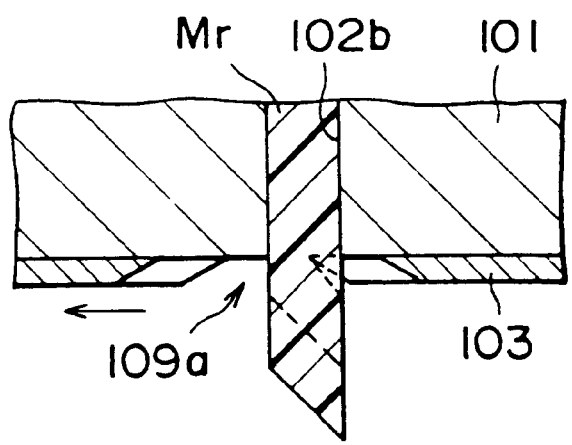

Next, as shown in FIG. 35A, when the stem-portion-molding opening 109*a*-1 of the second extruding nozzle 103 continues its sliding movement so as to cross the rectangular opening 102*b*, one side half portion of the stem portion 13 with a cross section of a parallelogram inclined with a certain crossed axes angle θ with respect to the resin extruding direction is molded by the molten resin passing through the rectangular opening 102*b*, while one side half portion of the coupling head portion 14 is linearly extruded in the molding direction with a width of the rectangular opening 102*b*, and the molding is continued (see FIG. 36 and FIG. 37). The crossed axes angle θ is determined by the operating speed of the second extruding nozzle 103.

Figure 38A:
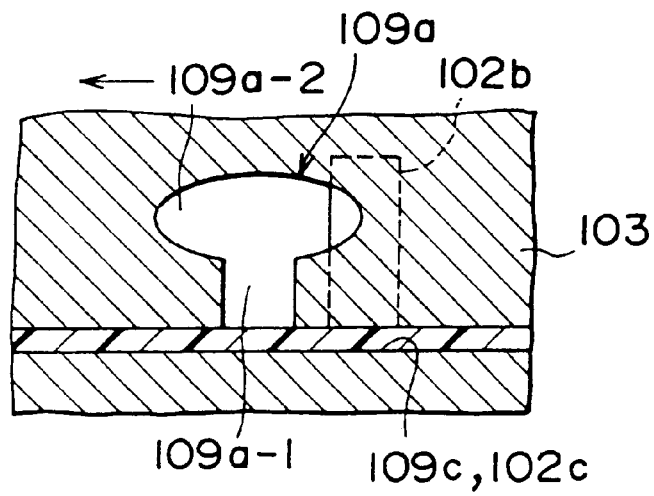
FIGS. 38A and 38B are views for explaining a seventh stage of the molding principle.
Figure 38B:
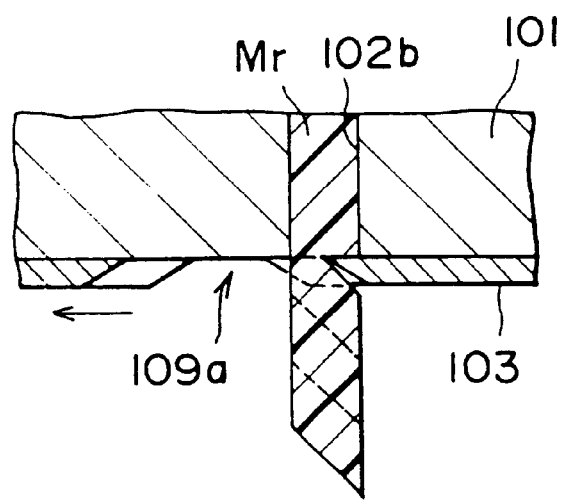
Figure 39A:
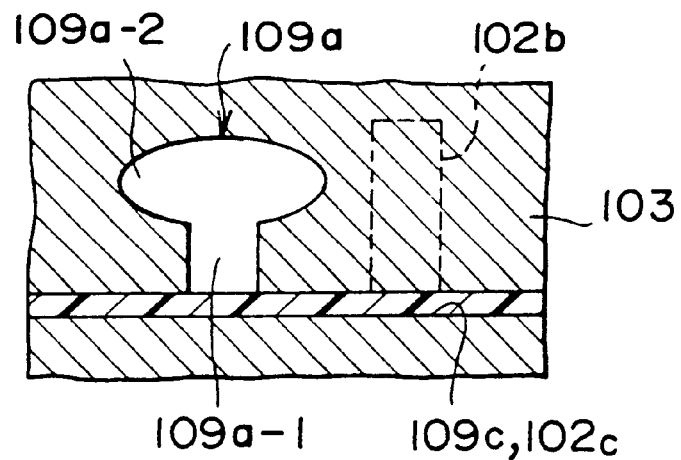
FIGS. 39A and 39B are views for explaining an eighth stage of the molding principle.
Figure 39B:
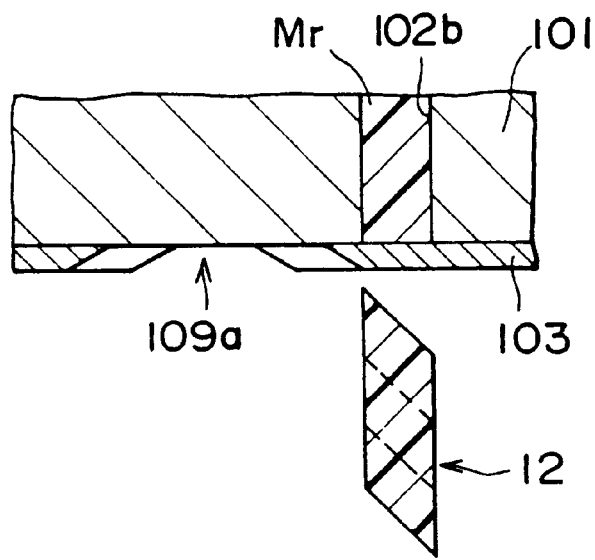

Furthermore, when the coupling-element-molding opening 109*a* continues its sliding movement in the same direction and the stem-portion-molding opening 109*a*-1 thereof has passed the rectangular opening 102*b*, the amount of resin passing through the rectangular opening 102*b* is gradually decreased according to a shape of a projecting part on the other side of the head-portion-molding opening 109*a*-2 and the overlapped part, and the other side half portion of the cross section of the parallelogram is formed (see FIG. 38). When the head-portion-molding opening 109*a*-2 has completely passed through the rectangular opening 102*b*, a single coupling element 12 is completely molded (see FIG. 39).

When the above operation has finished and a single coupling element 12 is molded, the second extruding nozzle 103 moves in a direction opposite to the above sliding direction. During this movement in the opposite direction, a plurality of coupling elements 12 each having a cross section of a parallelogram having a reverse form to the coupling element 12 molded during the previous sliding movement, which assumes a mirror symmetrical form with the formerly molded coupling element 12, are molded with its long sides in parallel to the molding direction.

Thus, each time the second extruding nozzle 103 repeats its reciprocating motion, a plurality of coupling elements 12 arranged laterally in a row and a base member 11 are simultaneously molded, and a base member 11 with a desired length and a desired number of coupling elements 12 are continuously molded with the long sides of the coupling head portion 14 are parallel to the molding direction. In the apparatus of this second embodiment, similarly to the apparatus of the first embodiment, the molded surface fastener 10 which is extruded from the second extruding nozzle 103 and is continuously molded, is then introduced to a peripheral surface of the cooling cylinder 111 rotating in one direction, and after being rotated by a half turn, it is picked up by a pick-up roller 112, and is sent out to the next step or a winding section through the feed roller 113.

Figure 41:
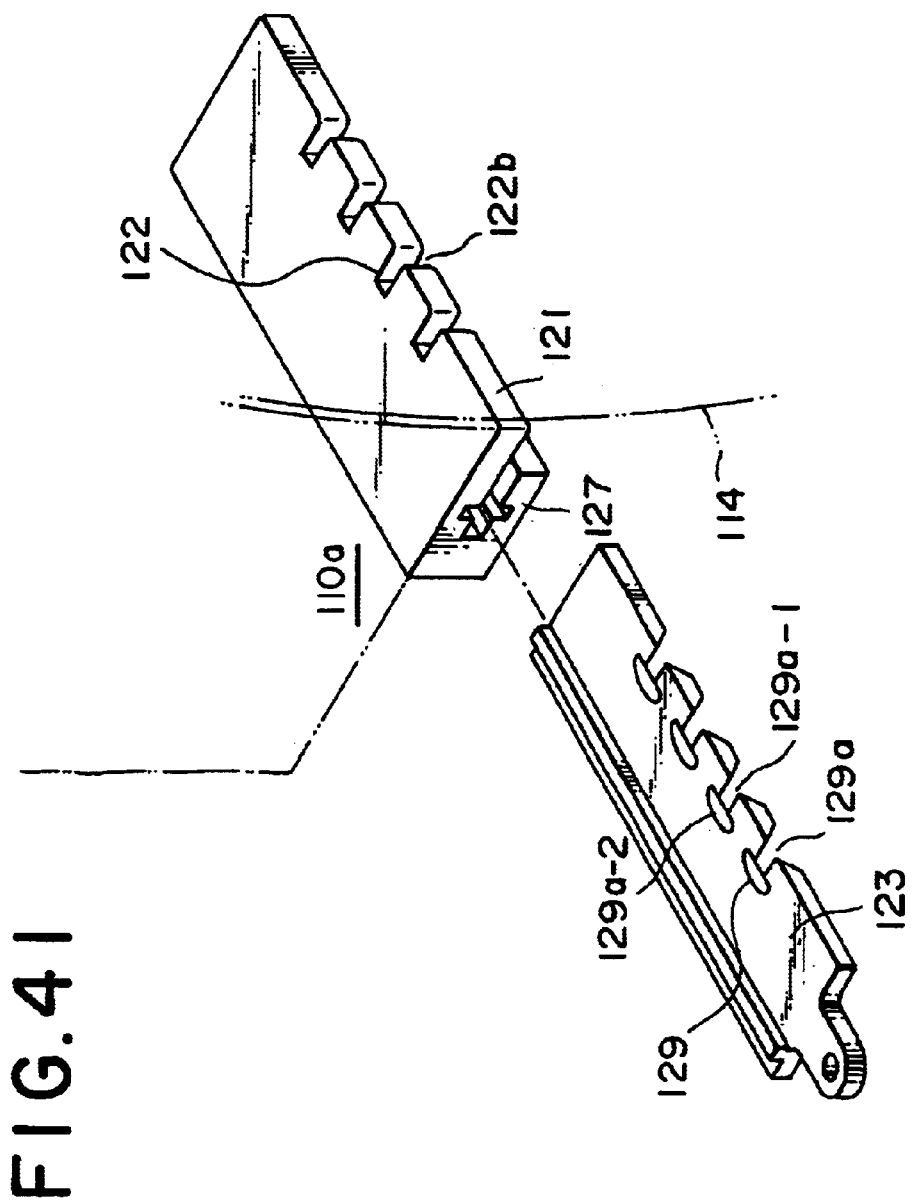
FIG. 41 is an exploded perspective view showing an example of a structure of the first and second extruding nozzles of the molding apparatus.
Figure 42:
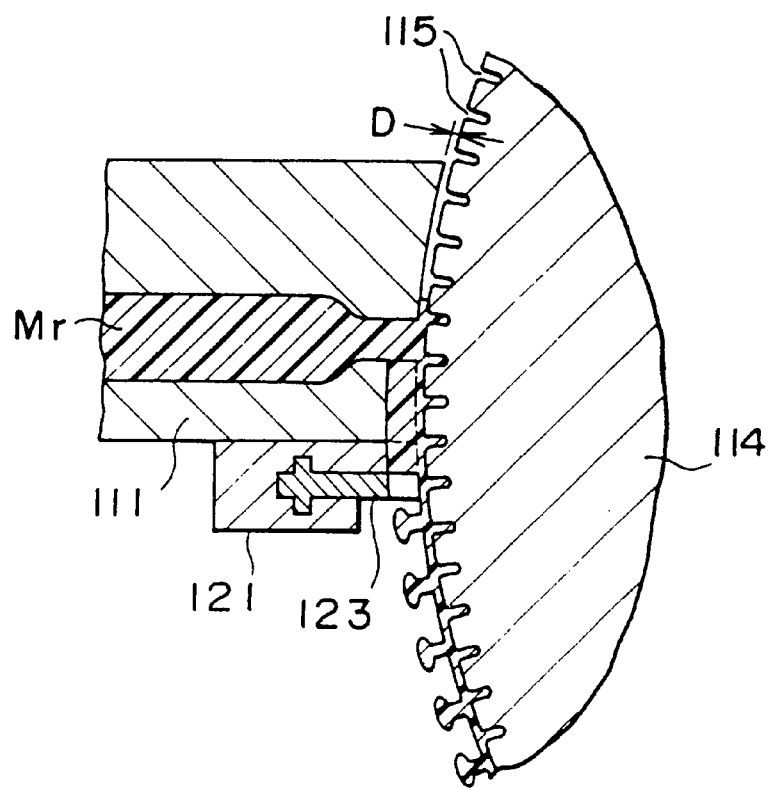
FIG. 42 is a partial cross sectional view showing a structure of a main section of the molding apparatus.
Figure 43:
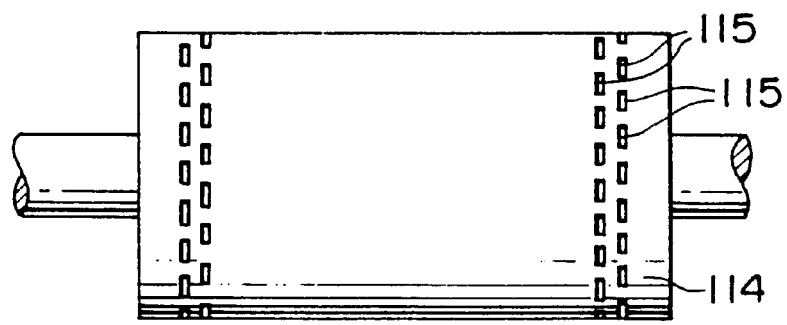
FIG. 43 is a front view of a cooling cylinder arranged in front of a die of an extruding machine in the molding apparatus.

FIG. 40 to FIG. 43 show a third embodiment of a molding apparatus for a molded surface fastener according to the present invention, which realizes a molding method of the second system according to the present invention. FIG. 40 is a side view showing an example of a schematic arrangement of the molding apparatus. FIG. 41 is an exploded perspective view showing a manner in which the first and second extruding nozzles of the molding apparatus are arranged, and FIG. 42 is an enlarged cross sectional view of the respective extruding nozzles. FIG. 43 is a front view of a cooling cylinder in the present embodiment, arranged at a front surface of the die of the extruding machine.

In this embodiment, the cooling cylinder 114 is provided facing to the extruding die 110a of the extruding machine 110 with a predetermined clearance. To a lower surface of a tip portion of the extruding die 110a, the first extruding nozzle 121, the second extruding nozzle 123, and an operational mechanism of the second extruding nozzle 123 are fixedly provided in the assembled state. A basic structure of the first extruding nozzle 121 and second extruding nozzle 123 is equal to that of the previous embodiments, but in the first extruding nozzle 121 and the second extruding nozzle 123 according to the present embodiment, a sheet-like base member 11 is molded between the assembled extruding nozzles 121, 123 and the cooling cylinder 114. Therefore, in the present embodiment, an extruding hole 122 of the first extruding nozzle 121 on the fixed side merely has the longitudinal rectangular opening 122b arranged independently, and furthermore, an extruding hole 129 of the second extruding nozzle 123 also has nothing but coupling-element-molding openings 129a. Then, each of the rectangular opening 122b and coupling-element-molding opening 129a has tip cut off, so that any extruding hole corresponding to the base-member-molding opening 102c and the communicating section 109c in the first embodiment is not formed.

The first extruding nozzle 121 in the apparatus of the present embodiment has such a form that a pressing board 127, which corresponds to the pressing panel 107 in the apparatus of the first embodiment, is provided integrally. As shown in FIG. 40, the second extruding nozzle 123 is slidably inserted between the pressing board 127 and the first extruding nozzle 121.

The extruding hole corresponding to the base-member-molding opening 102c and the communicating section 109c in the first embodiment of the apparatus is unnecessary in this embodiment since the sheet-like base member 11 is continuously molded together with the coupling elements 12 by forming a gap D, which corresponds to thickness of the sheet-like base member 11, with respect to the cooling cylinder 114 as shown in FIG. 42. Furthermore, the cooling has already been started at the time when the first and second nozzles 121 and 123 are passed and the molding is carried out, therefore, while rotating on a peripheral surface of the cooling cylinder 114, such a large shrinkage as cannot be ignored arises in the molded product especially in a width direction of the molded product depending on its materials. Therefore, in the present embodiment, as shown in FIG. 43, at an end portion of the peripheral surface of the cooling cylinder 114 in the axial direction, a multiplicity of cavities 115 for molding anchor members 15 are formed in two lines by a predetermined pitch in the circumferential direction thereof. The respective two adjacent lines of the cavities 115 for molding the anchor members 15 are arranged mutually in a zigzag manner.

With the molding apparatus of a molded surface fastener according to this embodiment having such an arrangement, the molten resin extruded from the extruding die 110a is directly introduced onto the peripheral surface of the cooling cylinder 114, so that its viscosity are increased. In that state, it adheres to the peripheral surface of the cooling cylinder 114, and it is guided to a lower portion of the die 110a by the rotation of the cylinder 114, and after passing through the extruding hole 122 of the first extruding nozzle 121 on the fixed side, a part thereof passes through the extruding hole 129 of the second extruding nozzle 123 reciprocating in parallel with the axis of the cooling cylinder 114. At this time, a molded surface fastener 10 of the present invention having a form shown in FIG. 44 is molded on the basis of the above mentioned molding principle.

Figure 44:
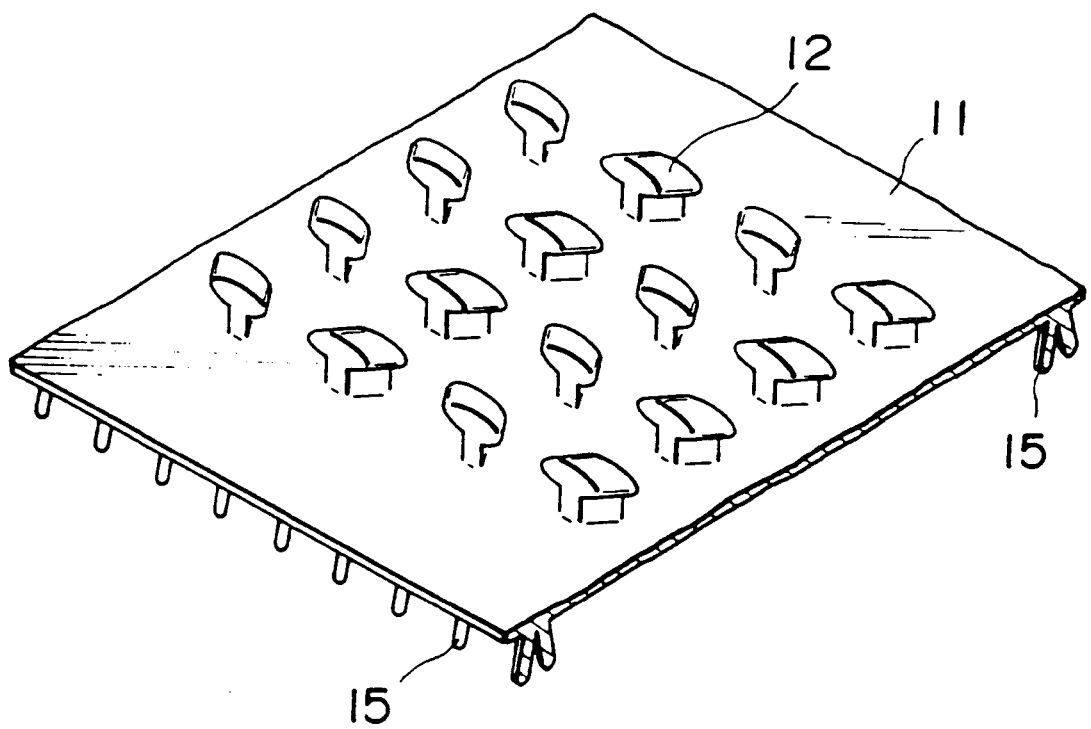
FIG. 44 is a perspective view showing a part of the molded surface fastener molded by the third embodiment of the molding apparatus.

Furthermore, simultaneously with the molding of the molded surface fastener 10, the anchor members 15 are molded at both end portions in the width direction of the surface fastener, as shown in FIG. 44, by using the cavities 115 for molding the anchor members formed in the cooling cylinder 114, on the surface of the sheet-like base member 11 on the opposite side where the coupling elements 12 are not molded. The shape of each anchor member 15 may be in a simple linear shape, but it is desirable to adopt such an inclined form that each pair of adjacent anchor members 15 are mutually separated from the base end toward the tip thereof. The part of the base member 11 where this anchor member 15 is molded is cut and eliminated at the following finishing step.

In this embodiment, though the second extruding nozzle 123 is reciprocated, but it is also possible that the second extruding nozzle 123 is fixed and the first extruding nozzle 121 is reciprocated. Furthermore, it is also possible to simultaneously operate both the first extruding nozzle 121 and the second extruding nozzle 123 so that they may reciprocate in the mutually crossing direction.

Figure 30:
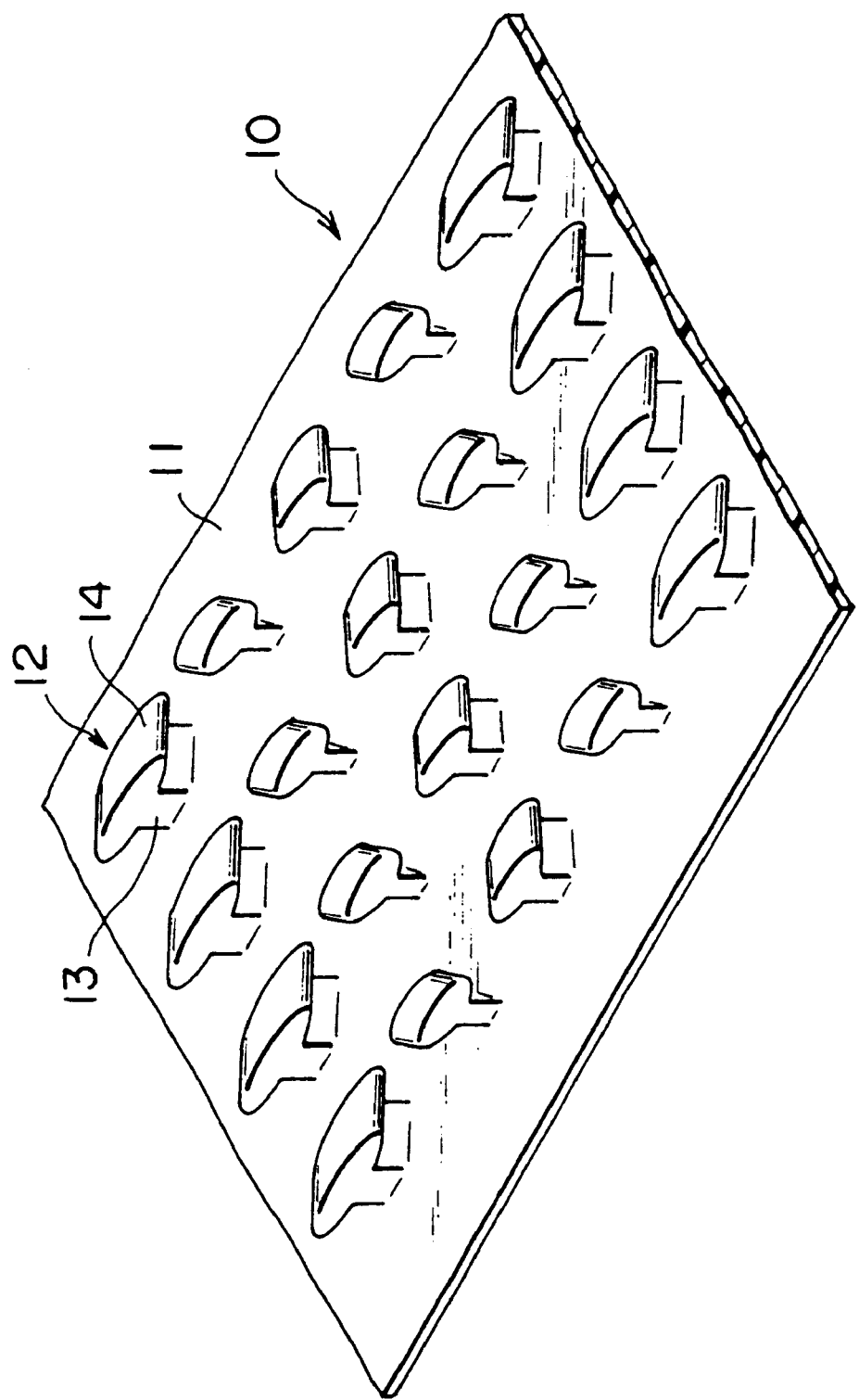
FIG. 30 is a partial perspective view showing an example of a form of the surface fastener in which the coupling elements having different thickness in the molding direction are mixedly molded.

Furthermore, in the case where a control section 106a which changes and controls an operating speed of the extruding nozzle 123 is provided to the operational mechanism of the second extruding nozzle 123 so as to regularly or randomly change and control the operating speed, the amount of the molten resin extruded from the head-portion-molding opening 129a-2 and the stem-portion-molding opening 129a-1 per unit time, can be regularly changed in the molding direction. Therefore, as shown in FIG. 30, a group of coupling elements 12 having coupling head portions 14 different in thickness in the molding direction can be mixedly molded in the molding direction on the same surface of the base member 11.

Figure 31:
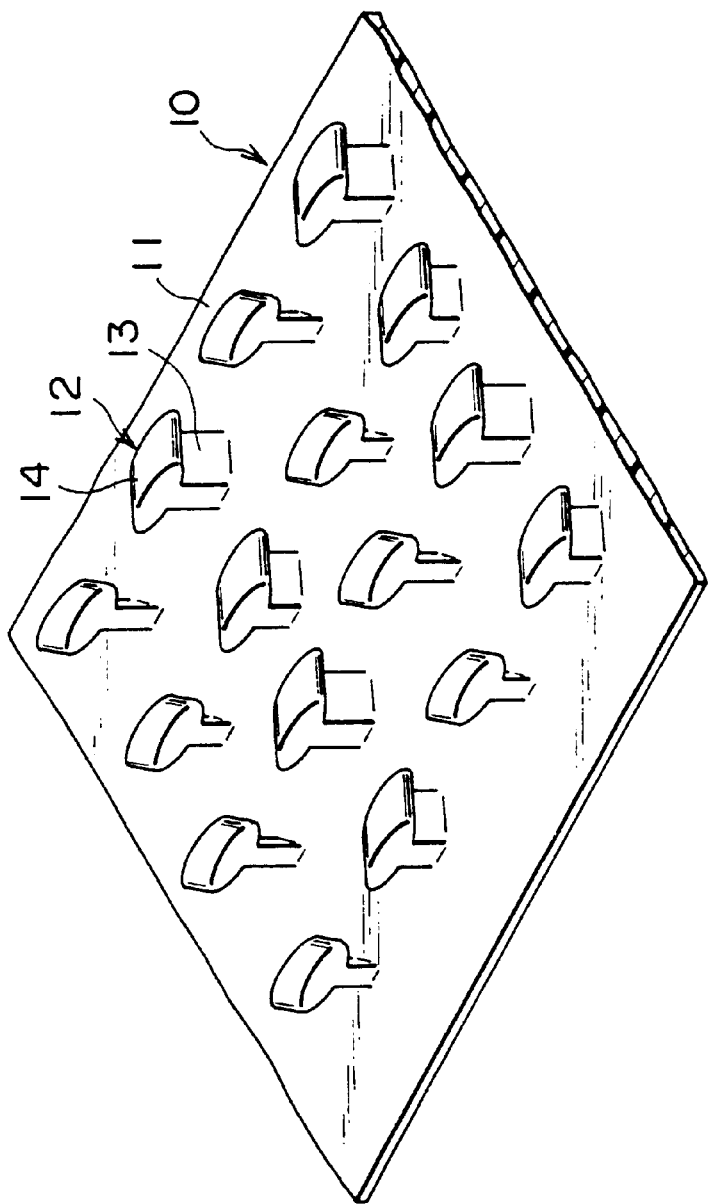
FIG. 31 is a partial perspective view showing an example of a form of the surface fastener in which the heights of a plurality of the coupling elements arranged laterally in a row are different.

Still further, in a case where the heights of a plurality of coupling-element-molding openings 129a formed laterally in a row in the second extruding nozzle 123 are formed to be arbitrarily different in the third embodiment, it is also possible, as shown in FIG. 31, that the heights of a plurality of coupling elements 12 arranged side by side in the width direction of the sheet-like base member 11 can be made to be different.

In the present invention, it is also possible to properly combine the coupling elements 12 in which both the thickness in the molding direction of the coupling head portion 14 and the heights of the coupling elements 12 are simultaneously different, by changing and controlling the reciprocation speed of the extruding nozzles 101, 121, 103, 123 and simultaneously making the heights of the coupling-element-molding openings 102a, 109a, 129a laterally in a row different.

As can been understood from the above description, in the molded surface fastener according to the present invention, the coupling elements 12 molded on the sheet-like base member are respectively independently molded. Therefore, when compared with a conventional molded surface fastener which is manufactured in such a way that together with a base member, a plurality of pieces of ribs each having a cross section of a coupling element extending on the base member are molded by extrusion molding, and then, the ribs are cut by a given pitch along the longitudinal direction of the surface fastener, and thereafter, the base member is drawn to be separated into individual coupling elements, the surface fastener 10 according to the present invention is provided with excellent feeling of touch, and furthermore, the coupling elements 12 having various sizes and forms can be mixedly molded on the same surface of the base member 11. Consequently, a required coupling rate and coupling force can also be ensured, for example, with respect to a mating loop member in which loops different in size are mixedly arranged.

Furthermore, the surface fastener of the present invention can be continuously molded by a single step by using the molding method and molding apparatus according to the present invention. Therefore, when compared to the conventional method and apparatus, considerable improvement of productivity and reduction of space for equipment can be achieved, and especially, the apparatus of the present invention can be practiced only by applying a little improvement to a conventional molding apparatus of the same kind, so that load of the equipment cost can be decreased.

What is claimed:

1. A molding method of a molded surface fastener for continuously and integrally molding a sheet-like sheet base member and a multiplicity of coupling elements, comprising the steps of:
   (a) continuously extruding molten resin material from a first extruding hole extending in a width direction of a first extruding nozzle arranged on the downstream side in an extruding direction of the molten resin material via an extruding die of an extruding machine;
   (b) passing the molten resin material extruded from the first extruding nozzle through a second extruding nozzle which is arranged at a front surface of the first extruding nozzle and has a second extruding hole corresponding to the first extruding hole;
   (c) relatively vibrating the first extruding nozzle and the second extruding nozzle in the width direction in such a way that the respective extruding holes facing each other mutually cross,
   (d) extruding the molten resin material from the extruding machine on a peripheral surface of a cooling cylinder rotating in one direction so as to mold a sheet molten resin layer on the peripheral surface; and
   (e) introducing the sheet molten resin layer into the first and second extruding nozzles arranged facing the cooling cylinder on a downstream side of the molten resin layer,
   wherein one of the first extruding hole and the second extruding hole includes a plurality of longitudinal rectangular openings arranged in the width direction, and the other extruding hole has coupling-element-molding openings arranged so as to correspond to the rectangular openings.

2. A molding method according to claim 1, wherein the first extruding hole has the coupling-element-molding openings, and the second extruding hole has the longitudinal rectangular openings, and a periphery of each of the longitudinal rectangular openings is formed to have a tapered surface gradually enlarged toward the downstream side in the extruding direction, and that the second extruding nozzle is vibrated on the front surface of the first extruding nozzle.

3. A molding method according to claim 1, wherein the first extruding hole has the longitudinal rectangular openings, and the second extruding hole has the coupling-element-molding openings, and a periphery of the coupling-element-molding opening is formed to have a tapered surface gradually enlarged toward the downstream side in the extruding direction, and the second extruding nozzle is vibrated at the front surface of the first extruding nozzle.

4. A molding method according to claim 1, wherein the first extruding nozzle and the second extruding nozzle in series are in close contact with the extruding die, and the molten resin material is directly extruded to the first extruding nozzle from the extruding machine.

5. A molding method according to claim 1, further including the step of cooling the molten resin molding material which has passed through the second extruding nozzle.

6. A molding method according to claim 1, further including the step of molding a plurality of anchor members integrally on opposite edge portions of the sheet base member where the coupling elements are not molded, by anchor-member-molding cavities formed on the cooling cylinder at right and left periphery portions in the axial direction thereof.

7. A molding method according to claim 1, wherein each of the coupling-element-molding openings of one of the extruding holes is shaped approximately like T.

8. A molding method according to claim 1, wherein each of the coupling-element-molding openings of one of the extruding holes is shaped approximately like Y.

9. A molding method according to claim 1, wherein a tip of each head-portion-molding openings in the coupling-element-molding openings of one of the extruding holes is bent toward a base-member-molding opening.

10. A molding method according to claim 1, wherein a vibration speed in said vibrating step is regularly changed.

11. A molding method according to claim 1, wherein a vibration speed in said vibrating step is randomly changed.

12. A molding method according to claim 1, wherein at least one of the coupling-element-molding openings among a plurality of coupling-element-molding openings arranged laterally side by side, are different from the other coupling-element-molding openings in height.

13. A molding method of a molded surface fastener for continuously and integrally molding a sheet-like sheet base member and a multiplicity of coupling elements, comprising the steps of:
   (a) continuously extruding molten resin material from a first extruding hole extending in a width direction of a first extruding nozzle arranged on the downstream side in an extruding direction of the molten resin material via an extruding die of an extruding machine;
   (b) passing the molten resin material extruded from the first extruding nozzle through a second extruding nozzle which is arranged at a front surface of the first extruding nozzle and has a second extruding hole corresponding to the first extruding hole;
   (c) relatively vibrating the first extruding nozzle and the second extruding nozzle in the width direction in such a way that the first and second extruding holes are facing mutually across from each other,
   (d) extruding the molten resin material from the extruding machine on a peripheral surface of a cooling cylinder rotating in one direction so as to mold a sheet molten resin layer on the peripheral surface; and
   (e) introducing the sheet molten resin layer into the first and second extruding nozzles arranged facing the cooling cylinder on a downstream side of the molten resin layer, wherein a crossing area of the first and second extruding holes is made to be gradually increased so that an amount of the molten resin material passing is gradually increased, and then the crossing area is made to be gradually decreased so that the amount of the molten resin material passing is gradually decreased.

* * * * *

UNITED STATES PATENT AND TRADEMARK OFFICE
CERTIFICATE OF CORRECTION

PATENT NO. : 6,706,229 B2
DATED : March 16, 2004
INVENTOR(S) : Ryuichi Murasaki

It is certified that error appears in the above-identified patent and that said Letters Patent is hereby corrected as shown below:

Title page,
Item [30], Foreign Application Priority Data, insert:
-- Japan 10-101363 July 17, 1998 --.

Column 19,
Line 28, "a sheet-like sheet" should read -- a sheet --.

Column 20,
Line 43, "a sheet-like sheet" should read -- a sheet --.

Signed and Sealed this

Twenty-fifth Day of May, 2004

JON W. DUDAS
*Acting Director of the United States Patent and Trademark Office*